(12) United States Patent
Sakai et al.

(10) Patent No.: US 7,733,563 B2
(45) Date of Patent: Jun. 8, 2010

(54) OPTICAL PROPERTIES RESTORATION APPARATUS, THE RESTORATION METHOD, AND AN OPTICAL SYSTEM USED IN THE APPARATUS

(75) Inventors: Satoshi Sakai, Yokohama (JP); Shigenori Tsuruga, Yokohama (JP); Hideo Yamakoshi, Yokohama (JP); Shizuma Kuribayashi, Yokohama (JP); Minoru Danno, Yokohama (JP); Hiroshi Futami, Yokohama (JP); Noriko Yamazaki, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 11/682,794

(22) Filed: Mar. 6, 2007

(65) Prior Publication Data

US 2007/0158600 A1    Jul. 12, 2007

Related U.S. Application Data

(62) Division of application No. 10/833,998, filed on Apr. 29, 2004, now Pat. No. 7,190,512.

(51) Int. Cl.
*G02B 5/20* (2006.01)

(52) U.S. Cl. ........................ 359/361; 359/350

(58) Field of Classification Search ............ 359/350, 359/361
See application file for complete search history.

(56) References Cited

U.S. PATENT DOCUMENTS

| 3,130,254 | A  | * | 4/1964  | Stevenson et al. ............ 372/41 |
| 6,452,199 | B1 |   | 9/2002  | Partlo et al. |
| 6,653,024 | B1 | * | 11/2003 | Shiraishi et al. ................ 430/5 |
| 2004/0229394 | A1 | * | 11/2004 | Yamada et al. ................ 438/66 |

FOREIGN PATENT DOCUMENTS

| EP | 0 726 099 B1 | 10/2000 |
| EP | 1 083 777 | 3/2001 |
| EP | 1 172 670 A2 | 1/2002 |
| JP | 1223786 | 9/1989 |
| JP | 3-77258 A | 4/1991 |
| JP | 5-325893 A | 12/1993 |

(Continued)

OTHER PUBLICATIONS

Samson, James A. R., "Techniques of Vacuum Ultraviolet Spectroscopy," Light Sources, 1967, pp. 158-162, Pied Publications, Lincoln, Nebraska.

(Continued)

*Primary Examiner*—Joshua L Pritchett
(74) *Attorney, Agent, or Firm*—Birch, Stewart, Kolasch & Birch, LLP

(57) ABSTRACT

An optical system has fluoride compounds provided in an environment exposed by vacuum ultraviolet light or plasma light, which has higher photon energy than an absorption wavelength of a base stock of the optical system. 1-layer of a protective film of $SiO_2$ or metal oxides having a film thickness of 2-20 nm is formed at least on the light irradiation side (inner side) of the optical system to prevent the stripping of the fluorine atoms from the surface of the optical system. In addition, the protective film is a 1-layer film selected from one of $SiO_2$, $MgO$, $TiO_2$, or $ZrO_2$.

3 Claims, 9 Drawing Sheets

FOREIGN PATENT DOCUMENTS

| | | |
|---|---|---|
| JP | 8-212976 A | 8/1996 |
| JP | 8-315771 A | 11/1996 |
| JP | 2001-293442 A | 10/2001 |
| JP | 2001-319618 A | 11/2001 |
| JP | 2002-115047 | 4/2002 |
| JP | 2002-219429 A | 8/2002 |

OTHER PUBLICATIONS

Ginzton, E. L., Microwave Measurements, 1957, Opp. 346-374, 435-461, McGraw-Hill, New York.

Kuribayashi, S. et al., "Ultra-Sensitive High-Speed Monitoring Technology for Trace-Level Toxic Halogenated Hydrocarbon Compounds," Technical Review, p. 1-6, vol. 40, No. 6 (Dec. 2004), Mitsubishi Heavy Industries, Ltd., Japan.

* cited by examiner

Acceleration Voltage 15.0 kV
Irradiation Current 5.198e-08A
Collection(ms) 500.00

C WD3 CH-5 LDE2
Ka  1 Primary Line
Peak  129.8500 mm
Integration Times 4

Depth distribution in blank light transmitting window (before use)

Depth distribution in blank light transmitting window (after use)

Depth distribution in protective film coated light transmitting window (before use)

Depth distribution in protective film coated light transmitting window (after use)

(Prior Art)

OPTICAL PROPERTIES RESTORATION APPARATUS, THE RESTORATION METHOD, AND AN OPTICAL SYSTEM USED IN THE APPARATUS

This application is a Divisional of co-pending application Ser. No. 10/833,998, filed on Apr. 29, 2004 now U.S. Pat. No. 7,190,512, the entire contents of which are hereby incorporated by reference and for which priority is claimed under 35 U.S.C. §120.

BACKGROUND OF THE INVENTION

1. Field of the Invention

The present invention relates to an apparatus and method for improving the reliability and longevity of optical properties of an optical system by preventing, suppressing, or improving degradation of optical properties of an optical system lying in output light or along a light path of said output light, wherein said optical system is provided within a near vacuum zone where organic components may be decomposed, said degradation is caused by carbon deposited or accumulated upon light irradiation surfaces, light reflection surfaces, light emission surfaces (collectively called 'lighting surfaces') of said optical system, and said surfaces faces said vacuum zone. More specifically, it relates to an optical properties restoration apparatus and a method to use it, and such optical properties restoration apparatus is used for improving the optical property of a variety of optical systems provided outside of a light transmitting window of a variety of optical apparatus that produce combination effects of light transmission, refraction, reflection, spectrum generation and interference etc. by using high photon energy light, such as conventional ultraviolet light or vacuum ultraviolet light.

Furthermore, this invention relates to optical systems in a variety of optical apparatus and a method to use it. The optical systems improve the optical properties inside of a light transmitting window of a variety of optical apparatus that produce combination effects of light transmission, refraction, reflection, spectrum generation and interference etc. and the optical systems are provided on the light path of high photon energy light, such as conventional ultraviolet light or vacuum ultraviolet light. More specifically, the invention can be applied to the optical systems equipped with lenses, windows, etalons, prisms, reticles, and reflecting mirrors, etc., and high photon energy lamps equipped with such optical systems. Further, the invention can be applied to not only optical measurement equipments such as spectrometers, fluorescent light meters, interference meters, diffraction meters, but also to a variety of optical equipments that incorporate standard light sources for vacuum ultraviolet light, light sources for exciting chemical reactions, printing plate and photographic applications, and various light sources for experimental applications.

2. Description of the Related Art

FIG. 14 will be used to explain the component parts and operation of a microwave excited hydrogen ultraviolet lamp as an example of a conventional optical output apparatus to which this invention may be applied. This apparatus is described in Non-Patent Publication 1, which is "written by James A, R. Samson, Techniques of Vacuum Ultraviolet Spectroscopy, Pied Publications, Lincoln, Nebr., 1967, P159, Figure 5.56". The microwave oscillator 4 has a sealed tube shaped component which is provided with both ends made of an identical electrical conductive material. The inner diameter and the length of the tube are determined by the frequency of the used microwave, and the electromagnetic field distribution to be excited in the microwave oscillator.

Microwave oscillator tuner 18 is a tube shaped component that is an essential component of the microwave oscillator that allows the adjustment of the microwave electromagnetic field distribution of the microwave oscillator, and its inside diameter is such that it envelopes discharge tube 1. Further, it is inserted concentrically with end surface of microwave oscillator 4 along their bore axes, and its structure is such that it may slide in the axial direction as it maintains its role as an electrical guide for the microwave oscillator 4. Like microwave oscillator 4, the material used to form tuner 18 is copper or brass. The function of adjusting the microwave electromagnetic field distribution by said tuner 18 is performed by adjusting its insertion depth while generating discharge plasma 7 to thereby put the microwave concentration 6 into the desired generation position.

Further, discharge tube 1 is installed in a manner such that it passes through both end surfaces of microwave oscillator 4. Although it is generally true that greatest electrical field is generated along the bore axis of discharge tube 1, which lies along the bore axis of microwave oscillator 4, this is not always the case. The cross-sectional shape of discharge tube 1 is round, but it could equally well be square, etc.

Discharge tube 1 functions as the vacuum boundary, the flow path for the discharge gas, and the space in which the discharge plasma is generated. In the example illustrated in FIG. 14, in order to limit the space in which the discharge plasma is generated, the inside tube of the conductor has been extended along discharge tube 1 from the end surface of microwave oscillator 4 toward the inside of the microwave oscillator. Accordingly, discharge plasma 7 is generated in the space between the end of microwave oscillator tuner 18 and the end of the foregoing inside tube.

Microwave oscillator 4 is connected with microwave supply connector 5 that delivers the microwaves. Here, the shape of the connector is coaxial, but it could also be of the waveguide type. Either coaxial cable or coaxial pipe may be used as the transmission feed path to the coaxial connector.

Flange 17 is attached via O-ring 13 to hold the lamp in place, on the end of discharge tube 1 at the microwave oscillator tuner 18 side. There is an opening at the center of the foregoing Flange 17, which has an inside diameter corresponding to that of discharge tube 1, which thereby allows the extraction of the light emitted from discharge plasma 7 in the axial direction of discharge tube 1.

Light transmitting window 8 that is mounted in the opening of the foregoing Flange 17 serves two functions. One is as the vacuum boundary inside of discharge tube 1 to the atmosphere. The second is to allow the extraction of the light emitted from discharge plasma 7 to outside of the vacuum. The foregoing microwave oscillator is described in detail in Non-Patent Publication 2 which is "written by E. L. Ginzton, Microwave Measurements, McGraw-Hill, New York, 1957".

Discharge lamps having the above described constitution experience the problems described below, but before describing them, definitions of the terms used will be specified.

The vacuum ultraviolet range is the wavelength range of 0.2 to 200 nm. Light inside of that range will be termed ultraviolet light or vacuum ultraviolet light. The conventional wavelength for ultraviolet light is 200 to 380 nm (see Dictionary of Physics, published by Baifukan, and the Rika Nenpyo published by the National Observatory of Japan).

In FIG. 14, to distinguish the surfaces of the light transmitting window, the surface facing plasma discharge 7 shall be called inner surface 10, while the surface on the other side shall be called outside outer surface 11.

Problems in the Degradation of Optical Properties Outside of the Light Transmitting Window In FIG. 14, when light generated by discharge plasma 7, especially ultraviolet light and vacuum ultraviolet light, it irradiates through inner surface 10 of transmitting window 8, passes through transmitting window 8, and passes from outside outer surface 11 of light transmitting window 8.

Here, when ultraviolet or vacuum ultraviolet light is emitted in the atmosphere such light causes the dramatic absorption of oxygen, carbon dioxide, water vapor and the like, so normally, as shown in FIG. 14, there is a mechanism on the left side of Flange 17 (to wit, outside of light transmitting window 8) which helps maintain the vacuum. The zone in which this vacuum is maintained shall be called "vacuum zone" below.

Normally, any one of a variety of vacuum pumps may be used as the mechanism to maintain the vacuum. Although there are a variety of dry pumps that are oil free (which give off almost no organic gases) that are suitable for use, rotary type pumps are the most common. Therefore, vacuum zone 14 contains organic gas from the vapor pressure of the oil used in the pump.

Further, stainless steel or aluminum metal parts, or rubber sealing parts such as O-rings are also contained within vacuum zone 14, and depending upon the application, vacuum zone 14 may contain optical elements such as samples, lenses, diffraction elements, mirrors, filters, transmitting windows, stages or other positioning elements, etc. Ideally, all of the materials in contact with the above described vacuum zone 14, to wit, the stainless steel containers, aluminum containers, O-rings and other sealing materials, optical elements, work samples, position adjustment mechanisms and the like, should be oil free (meaning that they should themselves give off almost no organic gases).

It is especially the case in the semiconductor industry that as the processing size (the width of the circuit lines) becomes finer and finer, the wavelength of the light used to make the exposure pattern for the circuit has reached the vacuum ultraviolet light range. For example the wavelength of the fluorinated argon excimer laser used as the light source for such applications is 193 nm (which when converted to energy is 6.4 eV), but in recent years, development has proceeded on laser stepper apparatus that generate wavelengths of 157 nm.

However, in actual practice, it is difficult to avoid the emission of organic gases inside vacuum zone 14, which can arise from various factors such as lubricating oil that is used for the mechanical drive structure, contamination of the work sample, out gassing from the O-rings, out gassing from plastic parts, inadequate degreasing or cleaning of the parts, or contamination introduced by human error. Thus, in actual applications, the presence of organic gases inside the foregoing vacuum zone must be considered.

Organic gases inside vacuum zone 14 have a certain probability of being adsorbed onto outside outer surface 11 of light transmitting window 8. This adsorption probability varies according to the material comprising the light transmitting window 8 and the type of organic gases, but the appearance of the adsorption phenomena itself is unavoidable.

When organic gases are adsorbed onto outer surface 11, at the same time, ultraviolet light, especially vacuum ultraviolet light, generated by the plasma irradiates these organic gases, which causes the direct excitation of the organic gas molecules to put them in an active state. This produces reactions, which draw the hydrogen, a component element of the organic gases in a dehydrogenation reaction, and finally, the adsorbed organic gas is converted into carbon (graphite). When this state is reached, it is no longer a gas but a solid, which affixes itself to and accumulates on outer surface 11 of light transmitting window 8. The carbon accumulation then adsorbs new organic gases, and their irradiation by ultraviolet light, especially vacuum ultraviolet light, converts them to carbon as well, which causes the buildup to proceed. As this process continues, outer surface 11 of light transmitting window 8 becomes covered by a carbon film. Since carbon is black, it absorbs light of various wavelengths, and as the accumulation of the carbon on outer surface 11 continues, the transmission rate through light transmitting window 8 gradually diminishes.

Here, for simplicity of explanation, it was assumed that the organic gases are hydrocarbon gases and that a dehydrogenation reaction resulted in their conversion to graphite, but in actual practice, the organic gases may include other-than-hydrocarbon elements such as oxygen, nitrogen, iodine, fluorine, chlorine, etc., and such organic gases can be adsorbed onto outer surface 11 of light transmitting window 8 just as can hydrocarbon gases, and then, through the action of ultraviolet light, especially vacuum ultraviolet light, are converted and nongaseous components are left as residuals. Thus, strictly speaking the buildup is not graphite, but it is an amorphous solid having carbon as its primary component. For purposes of describing this invention, this solid primarily comprised of carbon shall be termed "carbon."

The phenomenon of carbon buildup requires the adsorption of organic gases and their irradiation by ultraviolet light, especially vacuum ultraviolet light. As the accumulation of carbon proceeds, the intensity of the ultraviolet light, especially vacuum ultraviolet light, that is emitted from outer surface 11 where carbon has accumulated is significantly diminished. Carbon buildup will continue until all of the light intensity is sapped. At that time, new dehydrogenation reactions cannot take place and the accumulation of the carbon film stops. Accordingly, this process is not one where a carbon film can grow without limits, but the phenomenon ceases once a limit film thickness has been reached.

Normally, the phenomenon of carbon buildup on outer surface 11 of the foregoing light transmitting window 8 does not proceed rapidly. The problem is one of diminishing transmission through the light transmitting window 8 over a long period of time. In spectrographic applications, when the quantity of light from the light source diminishes, it creates drift which affects the accuracy of the measurements, and in applications involving surface treatments by ultraviolet light irradiation, problems arise due to inadequate processing caused by diminished irradiation intensity.

One means of addressing this problem of the carbon buildup phenomenon is to strive for an oil-free vacuum zone 14, however, once an organic substance has contaminated vacuum zone 14, the cleanup process is extremely difficult. Accordingly, the conventional countermeasure to diminished transmission rates due to carbon accumulations on outer surface 11 of light transmitting window 8 involve using cleansers or polishing to remove the carbon to restore light transmitting window 8 to its original state, or replacing light transmitting window 8 entirely.

In the prior art, the decline in the light transmission rate of light transmitting window 8, to wit, its degradation, was the determining factor in lamp longevity. Lamps that had reached their longevity, had their light transmitting windows 8 cleaned or replaced, which required breaking the vacuum in vacuum zone 14 or in the lamp. This operation required several hours time during which the lamp could not be used.

Next, conventional countermeasures in response to degradation of the transmitting window due to carbon buildup will be described.

The technology disclosed in Japan Patent Application Publication No. 2001-319618 (Patent Publication 1) will be described below.

In this example, the light source in question was a hydrogen lamp. When the hydrogen is introduced into the discharge tube, a halogen is also sealed within as a means to increase the lamp's longevity. The halogen sealed therein is in the form of an organic halogen compound. This means that an organic halogen substance has been introduced into the discharge area. Then, when the lamp is in operation, the organic material decomposes and causes a film of organic material, primarily carbon, to adhere onto the inner wall of the discharge tube. This inner wall functions as the light transmitting window, and the adhesion of material on its walls invites a reduction in the quantity of light generated. As a countermeasure, the above-cited Patent Publication 1 proposed a pre-shipment treatment of the lamps that could forcibly cause a carbon film to adhere to the region that functioned as the light transmitting window where carbon was envisioned as building up during lamp operation, and then, during the normal operation of the lamp no additional carbon buildup would occur. This technology considered that there were finite limits to the generation of organic material and that this countermeasure would effectively create an environment where no new buildup would occur during the operation of the lamp.

However, as described above for vacuum zone 14, if the apparatus involved was one that required repeatedly opening to the atmosphere or vacuum release (such as in a spectrographic application where samples have to be replaced, in applications where optic elements have to be adjusted, or where work pieces need to be exchanged during surface treatments, etc.), even if the spec calls for no organic contamination to be introduced during the assembly and adjustment processes, not introducing such contamination is rare in actual practice and hence, it would be impossible to avoid degradation of light transmitting window 8

Further Japan Patent Application Publication No. 2001-293442 (Patent Publication 2) relates to a cleansing method to remove adsorbed organic materials from the surfaces of optical elements by means of a method that minimally includes: (1) a process to cleanse the optical elements with an organic solvent, (2) a process to irradiate the optical elements with ultraviolet light in the presence of oxygen, and (3) a process to heat and cleanse said optical elements. Not only does this disclosure have an objective that differs from removing accumulated carbon films from surfaces, but it further does not resolve the problem of cleaning optical elements such as the light transmitting window when there is a need to break the vacuum.

Further, Japan Patent Application Publication No. 2001-219429 (Patent Publication 3) discloses technology that is similar to that of the present invention. Its objective is to improve the treatment precision and treatment efficiency of cleansing, etc., and is characterized in that the surfaces of substrates including glass substrates, synthetic resin substrates, ceramic substrates, metal substrates, and composite substrates comprised of 1 or a plurality of the foregoing substrates are wetted on the surface inside of a heated gas atmosphere containing water vapor and subsequently, the substrate is irradiated with ultraviolet light in a mixed atmosphere of heated inactive gas and water vapor, which is at a lower concentration than was present in the wetting atmosphere, which thereby serves to dissolve organic substances adhering to the surface of said substrate, and moreover, reduction active seeds [H—] and oxidizing active seeds [—OH] are generated, and these active seeds [H—] and active seeds [—OH] react with the products of decomposition of the organic material.

The objective of said prior technology is not to remove the carbon film from surfaces, but rather, it aims to dissolve the organic adherents to substrate surfaces by reducing them to smaller molecules, especially with regard to irradiating the substrate surface with ultraviolet light, and cleansing and etching processes, which use the ultraviolet light irradiation as a means of substrate treatment. Not only does the objective differ from the present invention, but since the substrate surface must be in a saturated condition, it is premised on the water being a liquid under the reaction conditions. As a result, the method can only be used in an environment of near normal atmospheric pressure—it cannot perform optical element cleansing of light transmitting windows and the like under vacuum conditions, and it does nothing to resolve the problems that develop when it is necessary to break the vacuum.

Although the explanation up to this point has been limited to the phenomenon that occurs on the outer surface 11 of light transmitting window 8, this type of carbon buildup phenomenon is not confined to only outer surface 11 of light transmitting window 8. It is generally the case that the phenomenon of carbon buildup occurs on the surfaces of objects located in vacuum zone 14 that are irradiated by ultraviolet light, especially vacuum ultraviolet light, that is emitted from the light transmitting window 8. This phenomenon is unavoidable so long as the conditions of the presence of organic gases and ultraviolet light, especially vacuum ultraviolet light, coexist. The "objects" referred to in the foregoing explanation include the mirrors that switch the light path in spectroscopic applications, filters, lenses for focusing light and diffraction elements used in spectroscopic applications, lenses used for focusing light, and various filters used in surface treatment applications, in other words, any of a variety of optical elements. Hereinafter, any of such objects will be referred to collectively as "optical elements." When carbon accumulates on these optical elements it causes serious problems by reducing their light transmission and light reflectivity. In actual practice, it lowers or causes the total loss of function of apparatus used in vacuum zone 14.

Formerly, to counter such diminishment of the light transmission and reflection, such optical elements had to be replaced with new ones, but this approach leads to high maintenance costs and keeps the apparatus out of service for the time required for maintenance.

The problem with lamp longevity due to the deterioration of light transmitting window 8 is not confined to the microwave-excited hydrogen ultraviolet lamps that were described in the foregoing example, similar problems exist for a wide variety of lamps such as those using He, Ne, Ar, Kr, Xe, O2, N2, D2 (deuterium molecules), Hg, etc.; lamps using high frequency discharge, arc discharge, glow discharge, inductive barrier discharge, or flash discharge in their discharge mode; or in halogen lamps or carbon lamps that heat a filament using electrical current as their means of light generation.

Problems in the Degradation of Optical Properties Inside of the Optical Systems

The problem of lowing the light transmitting property from short wavelength ultraviolet light is not limited to the degradation of optical properties outside of the light transmitting window, but also the degradation of optical properties inside of the light transmitting window.

In recent years, in order to obtain better light transmitting properties from short wavelength ultraviolet light, SiO2 has been developed for use as the foregoing light transmitting windows.

Further, a problem with mercury vapor lamps is more serious comparing to the previous time, that the quartz glass used in them loses its clarity. The quartz glass in a mercury vapor lamp functions as the vacuum boundary to the outside for the inside of the lamp, and it also functions to transmit the ultraviolet light that is generated from the luminescence of the mercury, but the phenomenon losing the clarity degrades its light transmission properties and is a factor in the determination of lamp longevity.

In Japanese Patent Application Publication No. Hei 5-325893 (Patent Publication 4), for example, a countermeasure for losing the clarity was proposed as using a light emitting tube as the metal vapor electrical discharge arc tube, which employed a roughened inside surface of the glass bulb exhibiting a surface grain size of under 1 micron. So doing would impede the crystallization (losing the clarity) of the arc tube even after it had been operating for long periods of time, and thereby impede the decline in light flux (illumination sustenance rate) to make it possible to maintain bright pictures and high quality displays over a long period of time for projection type displays.

This technology was applied to quartz glass or high silicate glass used in arc tubes, and although it would be possible to apply it to conventional ultraviolet light applications in the 250-360 nm wavelength range, the transmission rate of quartz glass for vacuum ultraviolet light of a wavelength of 190 nm diminishes substantially.

Further, Japanese Patent Application Publication No. Hei 3-77258 (Patent Publication 6) discloses technology for 254 nm ultraviolet light constant pressure mercury vapor lamps, wherein the inside surface of synthetic quartz glass is coated with a 1 to 3% solution of metal oxide particles having an average particle diameter under 100 μm, which in the examples consisted of metal oxide having an average particle diameter of 20 μm.

Further, Japanese Patent Application Publication No. Hei 8-212976 (Patent Publication 7) discloses technology for a discharge lamp using an arc tube comprised of a quartz glass tube with mercury sealed within and electrodes sealed on each end, that employed a thin film coating of Al2O3, etc. on the inside of the tube, wherein the thin film is thicker on the inside surface of the foregoing arc tube near the center of the tube than it is in the other areas; specifically, the thick film area on the inside surface of the foregoing arc tube is ⅓ to ½ the length of the effective light emission length, which is the distance between the electrodes on either end of the arc tube, and is such that the film thickness in the aforementioned thick film area ranges from 0.2 μm to 0.3 μm, while the film thickness in the other areas ranges from 0.1 μm to 0.15 μm.

However, this prior art technology related to quartz glass, especially to that used in low pressure mercury discharge lamps, and it regulated the thickness of the protective film where the mercury atoms existed as a means to deal with the problem of the mercury being deposited upon the inside wall of the arc tube to thereby lower the transmission rate of light through the quartz glass and cause the blackening of the discharge lamp, which further diminishes its irradiation efficiency.

Furthermore, the lower limit for SiO2 delivering good light transmission rates is about the 200 nm level; light transmission drops dramatically with the shorter wavelength vacuum ultraviolet light that exhibits wavelengths lower than 200 nm. Furthermore, with very short wavelengths of vacuum ultraviolet light in the 150 nm vicinity such as used with high energy fluorine lasers, not only does the foregoing light transmission rate decline, but the material cannot stand up to the application and the losing the clarity occurs.

Also, considering the fact that with synthetic silica glass, there is a significant decrease in the transmission rate in the ultraviolet light range through window materials through which irradiated lamp light is transmitted, Japanese Patent Application Publication No Hei 8-315771 (Patent Publication 5) discloses fluorine doping technology for synthetic silica glass that aims at improving operational longevity.

However, using fluorine compounds to dope the silica glass base stock only allows about a 50% transmission range in the 160-190 nm wavelength ranges, and it cannot stand up to use in the lower wavelengths of vacuum ultraviolet light.

Accordingly, alkali halide materials, such as CaF2, LiF, MgF2, etc., have generally been used for light transmitting window stock when vacuum ultraviolet range ultraviolet light had to be transmitted.

A suitable example from the prior art is the aforementioned microwave-excited hydrogen ultraviolet lamp, which generated vacuum ultraviolet light at a wavelength of 122 nm. The only known materials that could be used for light transmitting windows were CaF2, LiF, and MgF2, and since LiF and CaF2 exhibited dramatically lower light transmission from their color center, MgF2 was most commonly used. However, there has been no disclosure of any report that dealt with countermeasures of losing the clarity for MgF2.

To wit, when the magnesium fluoride is used as the material for light transmitting windows, such windows exhibit a poorer longevity than other window materials, and compared with lamps that use other window materials, lamp longevity itself is only about half or less.

When using light with a higher photon energy than the absorption wavelength for the material used in light transmitting window 8, especially light in the vacuum ultraviolet range, when the light from the discharge plasma is irradiated upon light transmitting window 8, said window 8 develops a defect, a so-called color center is produced that lowers its light transmission rate. This phenomenon is also common to CaF2, LiF, MgF2 and other alkali halide materials, and is caused by the slight shift of fluorine atoms from their correct position within the lattice.

Further, the aforementioned conventional technology all addressed problems associated with synthetic quartz, especially synthetic quartz optical systems that used conventional wavelength ultraviolet light as the light source. There have been no proposals for practical technology that was effective in preventing the diminishment of the light transmission rate through MgF2, which is the material used in light transmitting windows for the 122 nm wavelength vacuum ultraviolet light generated by microwave-excited hydrogen ultraviolet lamps.

Due to this situation, when the transmission rate declines, the only way to deal with it is to replace the light transmitting window. In this prior art, the degradation of light transmitting window 8 as described above was the determining factor in lamp longevity. In the prior art, once the lifespan of the lamp's light transmitting window 8 was up, it would have to be replaced with a new light transmitting window to restore the light emission intensity of the lamp. The replacement of light transmitting window 8 requires the breaking of the lamp's vacuum and several hours of labor, during which time, the lamp cannot be used. Further, during the replacement cycle, the output intensity from the light source is constantly changing. Each time the transmitting window is replaced, it requires calibration operations for the light intensity. Thus, it is difficult to use such lamps in applications that require long-term monitoring, such as employed in environmental measurements.

SUMMARY OF THE INVENTION

The present invention was developed after reflecting upon the problems associated with the prior art, and it relates to an apparatus and method for restoring the optical properties in a variety of apparatus that employ optical systems to deliver effects such as light transmission, diffraction, reflection, spectrum generation, and interference and that use high photon energy light such as conventional ultraviolet light or vacuum ultraviolet light. In particular, the objectives of the present invention are to prevent or inhibit the deterioration of optical systems that determine the longevity of the foregoing apparatus, and by so doing, decrease the frequency of maintenance operations such as window replacement and to reduce the costs for such operations.

More specifically, according to the first preferred embodiment of this invention, the objective is to provide an apparatus and method for its use, which prevents or suppresses the degradation of said optical systems to thereby reduce the frequency of maintenance operations such as replacement of the optical systems as well as reduce the costs for such operations, by preventing or suppressing the accumulation of carbon on the surface of optical systems such as the optical system provided outside of light transmitting window 8 (for example, on outer surface 11 of light transmitting window 8 shown in FIG. 14).

An additional objective of the present invention is to make it possible to extend the longevity of optical equipment and improve the reliability of these apparatus by preventing or suppressing the accumulation of carbon on the irradiated surfaces and emission surfaces of optical elements lying within the light path in a vacuum zone.

Further, according to the second preferred embodiment of this invention, the objective, after reflecting upon the above described issues in the prior art, is to provide an optical system and method for its use, in variety of apparatuses that use combination effects of light transmitting, refracting, reflecting, spectrum and interference, which is provided in the light path of high photon energy light sources such as plasma light and vacuum ultraviolet light. The optical system would suppress the degradation of the optical equipment such as the aforementioned lenses, windows, etalons, prisms, reticles, reflecting mirrors and the like, all of which are provided inside of light transmitting window 8 (for example, on inner surface 10 of light transmitting window 8 shown in FIG. 14) to thereby maintain a stable and high intensity of light output over time, and to extend the longevity of apparatus using various types of optical systems.

FIRST PREFERRED EMBODIMENT

To resolve the above described issues, the present inventor continued research along the following lines.

Initially, in the first preferred embodiment, a detailed analysis of the degradation that occurs outside of light transmitting window 8 facing vacuum zone 14 (such as an outer surface 11) was performed. The apparatus employed in the experiments was that illustrated in FIG. 14, wherein light transmitting window 8 was attached via an O-ring to the plasma-exposed side of Flange 17. The analysis was performed on outer surface 11 of light transmitting window 8, to wit, the surface facing vacuum zone 14, which is the surface that emits the ultraviolet light. Since no deposits were found on inner surface 10 on the opposite side, no detailed analysis was performed on that surface.

Magnesium fluoride (MgF2) mono-crystal were used as the material for light transmitting window 8, and the crystal axis (c-axis) was aligned to be perpendicular with the surface of the transmitting window. Crystal size was 0.5 inch $\Phi \times 1$ mm thick. The crystal was a UV grade product made by Ohyo Koken Kogyo Co., Ltd. Several of such crystals from the same lot were procured, and the crystals employed were matched for the quality of the crystal and the condition of their surfaces. The crystals were analyzed after their use in the lamp and all efforts were made to eliminate any error inducing factors due to any variation within the lot.

In the experiment, the first order of business was to use an optical microscope to view outer surface 11 of light transmitting window 8 in the central $\Phi 8$ mm region through which the ultraviolet light was transmitted to observe any film-like material that might be adhering. Plastic forceps were then used to scrape at any adhering material, at which time it was discovered that a weakly adhering film of material was adhering to outer surface 11.

Next, an elemental analysis was performed on the adhering material. EPMA (electron probe X-ray micro-analyzer) was used to perform an elemental analysis of outer surface 11 of light transmitting window 8. (Analytical conditions: acceleration voltage 15 kV, irradiation current 5E-8A, measurement methods: qualitative analysis, fine analysis, mapping analysis.)

It was found as a result of the EPMA analysis that significant amounts carbon were detected on the central $\Phi 8$ mm region through which the ultraviolet light had been transmitted. The donut shaped region outside of the circular central $\Phi 8$ mm region through which the ultraviolet light was transmitted was in the shadow of Flange 17 and was a region through which no ultraviolet light had passed, but contamination levels of carbon were detected in this donut shaped region. What is meant by a 'contamination level' in this EPMA analysis would be the weak signal for carbon detection that is generated even when analyzing a thoroughly cleaned surface. Thus, it is an unavoidable adherence of carbon that generates such signals. Accordingly, the measurement limits for EPMA analysis with regard to carbon is determined by the carbon contamination level of the analytical apparatus. When the carbon signal level from the central $\Phi 8$ mm region was compared with the contamination signal level, the former was found to be significantly higher, which confirmed the fact that a film-like accumulation of carbon had occurred on outer surface 11 of the light transmitting window.

As has been previously stated, the mechanism for the carbon buildup, with reference to the apparatus shown in FIG. 14, involves organic gases being present in vacuum zone 14, and when these organic gases are absorbed on outer surface 11 of light transmitting window 8, and then when vacuum ultraviolet light is transmitted through light transmitting window 8, the organic gases undergo a dehydrogenation reaction to convert them to carbon, which accumulates upon outer surface 11.

As the use of light transmitting window 8 in the above-described environment continues, so does the accumulation of carbon, which, with time, reduces the rate of light transmission. Accordingly, since compared with its initial state, the transmission rate for light transmitting window 8 becomes reduced, some mechanism to remove this accumulated carbon from outer surface 11 is clearly required. Since it was found that the film-like accumulation of carbon upon outer surface 11 was the primary cause for the degradation of the light transmitting window, the present inventor continued research on counter measures, which lead to the below described completion of the present invention.

The present inventor, experimentally confirmed the below described approach to the problem. The raw material for the carbon is the organic gases, but it is virtually impossible to completely eliminate them. Further, if they are not irradiated by vacuum ultraviolet light, then no dehydrogenation reaction occurs, but then the apparatus would not be able to carry out its functions as a light emitting apparatus. The location of the carbon deposits exactly matches the position through which the vacuum ultraviolet light is irradiated. The vacuum ultraviolet light directly excites the organic gases to force the dehydrogenation reaction, but such high photon energy does not just excite organic gases, but many types of molecules can be so excited and put into an active state.

With reference to FIG. 1 as an example, the light output apparatus in this example is a 122 nm wavelength vacuum ultraviolet light output using hydrogen light emission, and the photon energy for this vacuum ultraviolet light is 10.2 eV. This level of photon energy will excite oxygen gas, H2O gas (steam) and can generate radicals having strong oxidizing power. The reason for maintaining vacuum zone 14 is because the oxygen, carbon dioxide, water vapor and other components of the atmosphere would absorb the vacuum ultraviolet light and weaken its intensity. Accordingly, the absorption medium, i.e. the atmospheric components, are eliminated by means of a vacuum pump, etc. to create vacuum zone 14.

However, even though these were atmospheric components, since they contained O2, water vapor and the like, it was found that by lowering their concentration appropriately (reducing their pressure), it was possible to generate radicals having oxidizing power without dramatically attenuating the vacuum ultraviolet light. When the light output apparatus was operated under conditions where concentration-adjusted atmospheric components coexisted and when the later stage vacuum zone 14 was implemented, it was possible to remove the carbon adherents on outer surface 11 of light transmitting window 8. Further, it was possible to remove the carbon adhering to the surface of all the optical elements located in vacuum zone 14. The reason why it was possible to remove the carbon in this way is that the carbon adherence to outer surface 11 of light transmitting window 8 was taking place at the same time as the carbon decomposition and removal by the radicals, and the rate at which the radicals were decomposing and removing the carbon exceeded its formation rate.

Since the decomposition reaction of the carbon using radicals converted the carbon into volatile molecules such as carbon dioxide and water vapor, these could be removed rapidly from the system using the vacuum pump. The radicals that are created in this case are elemental oxygen and ozone generated by the excitation of oxygen molecules, and OH radicals produced through the excitation of water vapor, etc.

Furthermore, when the light output apparatus is operated in the presence of these concentration-adjusted atmospheric components and when there were preexisting carbon deposits on outer surface 11 of light transmitting window 8, there was a gradual decomposition and removal of that carbon so that finally, it was possible to completely remove all of the carbon and restore light transmission window 8 to its original light transmission rate. Then, the light output apparatus was operated without operating the later stage vacuum zone function using optical elements already having carbon accumulation, and it was possible to remove the carbon from the surface of these optical elements that had been located in vacuum zone 14.

Accordingly, using the findings from this invention, it is possible to prevent the degradation of the transmission window of light output apparatus in order that the light intensity produced by said light output apparatus not be diminished, to thereby make it possible to not only eliminate the maintenance costs associated with replacement of the light transmitting window and maintenance down time for the equipment, but it is further possible by means of operating the light output apparatus to remove carbon deposits already formed on light transmitting window 8 or optical elements and to restore them to their original state to thereby recover full performance in the vacuum zone and to sustain vacuum zone 14 with reduced maintenance costs and maintenance frequency.

Next, the method used to adjust the concentration of the atmospheric components in the vacuum zone 14 environment will be explained. The gas supply can employ pure oxygen gas supplied from an oxygen cylinder. Alternatively, it can be drawn from the air, or, an air line already installed in the factory may be used. A gas cylinder filled with dried air may be used as well. It is further possible to use mixtures of oxygen and an inactive gas such as argon, helium or the like which are dispensable from gas cylinders. The pressure of the gas supply, as will be explained later in the configuration examples, may be controlled by the aperture of the valve and the ability of the gas cylinder to purge vacuum zone 14 and control the partial pressure of the gases.

It is further possible to add water vapor to the gases described above, or to use only water vapor. Water vapor may be added by means of preparing a container with water sealed within and have one area filled to saturation with water vapor, and then by mixing this water vapor with any of the above described gases. When used by itself, it need only to be introduced into vacuum zone 14. The temperature of the water may be room temperature, or it may be chilled or heated. The pressure of water vapor at the saturation level varies according to the temperature of the water, so it is possible, as will be described later in the configuration examples, to set the valve aperture and pump purging power to control the partial pressure of the water vapor in vacuum zone 14.

The partial pressures of the aforementioned gases in vacuum zone 14 are determined by the below described conditions. The upper limit for the gas partial pressure should be determined based upon the objective for absorption function for the vacuum ultraviolet light by the gases and by partial pressure that would not impede operations. In specific terms, for example, if it is oxygen gas, the upper limit should essentially be on the order of 10 mtorr (under 20 mtorr). Should that partial pressure level be exceeded, the absorption of the vacuum ultraviolet light by the oxygen would reach the point where it could not be ignored—it would begin to impede the functional objectives for vacuum zone 14. However, should the length of the light path through vacuum zone 14 be sufficiently short, it would be possible to ignore the effects of the oxygen concentration at higher upper limits. The accurate setting of the upper limit value can be determined by filling the vacuum zone 14 with a specified partial pressure of gas and checking whether the functional objectives have been impeded. Specifically, the amount of the vacuum ultraviolet light can be measured as a means of investigating the level of its attenuation.

The lower limit for the gas partial pressure should be set to be above the processing capability for the load at hand. Here, what is meant by 'load' is the rate at which carbon accumulates on outer surface 11 of light transmitting window 8 as determined by the type and concentration of the organic gases present, and the wavelength and intensity of the vacuum ultraviolet light 9 that is transmitted through light transmitting window 8. What is meant by 'processing capability' is the rate at which the carbon can be decomposed and removed by the radicals generated through the excitation of the gas by the vacuum ultraviolet light.

Experiments were performed by the present inventor that envisaged various cases for vacuum zone 14 in which there were some unknowns, but for example, in the case of vacuum zone 14 produced by a conventional turbo-molecular pump and using a dry pump exhaust system, the lower limit for oxygen gas, for example, would be about 0.01 to 0.1 mtorr. If this level of oxygen gas exists, then it will exhibit adequate processing capability for the load. Water vapor provides a relatively higher level of processing capability than oxygen, and its virtual lower limit would be on the order of 0.005 to 0.01 mtorr.

To accurately set this lower limit, oxygen can be used to fill the vacuum zone 14 that is in actual use to a certain partial pressure and then the light output apparatus can be operated followed by analysis for any adherents on outer surface 11 of light transmitting window 8. Appropriate methods of analysis include observation under an optical microscope or carbon analysis using EPMA. So long as the analysis does not reveal the presence of significant carbon deposits, the partial pressure that was used at that time can be confirmed to be on that allows the adequate decomposition and removal processing of the carbon.

Now, the below described technological means is proposed for this invention on the basis of the foregoing findings.

The invention relates to an apparatus which can attain the effects of the present invention. The present invention provides an optical properties restoration apparatus for improving the reliability and longevity of optical properties of an optical system by preventing, suppressing, or improving degradation of optical properties of an optical system lying in output light or along a light path of said output light, wherein said optical system is provided within a near vacuum zone where organic components may be decomposed, said degradation is caused by carbon deposited or accumulated upon light irradiation surfaces, light reflection surfaces, light emission surfaces (collectively called 'lighting surfaces') of said optical system, and said surfaces faces said vacuum zone, said optical properties restoration apparatus comprising: a means to create a near vacuum zone with a presence of active energy to excite an oxidation reaction of carbon, said near vacuum zone facing said lighting surfaces of said optical system; a means to generate negative ions or radicals in said near vacuum zone; a means to facilitate an oxidation reaction between said negative ions or radicals and said carbon in said near vacuum zone; and wherein said optical properties restoration apparatus removes or reduces the accumulated carbon which deposits on said lighting surface by the oxidation reaction More specifically, it includes: a means to create a near vacuum zone to excite an oxidation reaction of carbon, said near vacuum zone facing said lighting surfaces of said optical system; a means to generate a flow of an oxygen atom-containing gas such as water gas or oxide gas in said near vacuum zone; a means to supply active energy in said near vacuum zone to cause a carbon oxidation reaction between said oxygen atom-containing gas and the carbon; and wherein said optical properties restoration apparatus removes or reduces the accumulated carbon which deposits on said lighting surface by the oxidation reaction.

"Near vacuum zone" mentioned above can be defined by a vacuum space in which high active energy excitation excites a carbon oxidation reaction to decompose the carbon by eliminating hydrogen from the organic compound of hydrocarbon and etc. The pressure of the near vacuum space fluctuates by the strength of active energy and the oxidizing power of the oxygen atom-containing gas mentioned above, however it must be under several tens mtorr.

The invention further relates to an optical properties restoration method for improving the reliability and longevity of optical properties of an optical system by preventing, suppressing, or improving degradation of optical properties of an optical system lying in output light or along a light path of said output light, wherein said optical system is provided within a new vacuum zone where organic components may be decomposed, said degradation is caused by carbon deposited or accumulated upon light irradiation surfaces, light reflection surfaces, light emission surfaces (collectively called 'lighting surfaces') of said optical system, and said surfaces faces said vacuum zone, said optical properties restoration method comprising steps of: creating a near vacuum zone with a presence of active energy to excite an oxidation reaction of carbon, said near vacuum zone facing said lighting surfaces of said optical system; generating negative ions or radicals in said near vacuum zone; and removing or reducing the accumulated carbon which deposits on said lighting surface, by reacting the deposited carbon with the negative ions or radicals.

More specifically, the method is characterized by steps of: creating a near vacuum zone to excite an oxidation reaction of carbon where high active energy excitation exists, wherein said near vacuum zone faces said lighting surfaces of said optical system; and supplying active energy while supplying a flow of gases containing oxygen atoms (e.g. water vapor, oxygen, hydrogen peroxide, ozone or mixtures of them with inactive gases (including air)), such as water gas or oxidizing gas into said near vacuum zone, thereby removing or reducing the accumulated carbon which deposits on said lighting surface by exciting the oxidation reaction of the accumulated carbon with said supplied active energy.

Further, the foregoing optical system includes not just an optical elements comprised of light transmitting or reflecting members that are located on the boundaries of the near vacuum zone, but also the optical components comprised of diffraction, refraction, spectrum generation, transmitting and diffraction adjustment optical elements lying along the light path inside the vacuum zone, and the optical articles to be surface treated by the irradiated light, and further said optical system includes the position adjustment and retention mechanisms, containers, and seals of said optical elements or said optical articles as well.

Also, the invention may be effectively applied even in cases where the beam that forms said light path is normal ultraviolet light having a wavelength of 380 nm or under, or, vacuum ultraviolet light having a wavelength of 200 nm or under, and said optical system outputting said ultraviolet light or lying along a light path of said output light is an optical materials comprising one or combinations of fluoride compounds such as magnesium fluoride, calcium fluoride, barium fluoride, aluminum fluoride, Cryolite, Thiolite or other fluoride compounds, metal fluorides such as lanthamim fluoride, cadmium fluoride, neodymium fluoride, yttrium fluoride, or, high purity oxides such as synthetic quartz glass or sapphire.

Additionally, a lower limit value for a partial pressure of said gases containing oxygen atoms that is supplied to said near vacuum zone is preferably set to a level over a speed of the carbon buildup, in cases where the carbon from the decomposition of organic components in said near vacuum zone has already grown on the surfaces of said optical systems and opposing surfaces. Further, an upper limit value for a partial pressure of said gases containing oxygen atoms that is supplied to said near vacuum zone is preferably set to below the level where the absorption of vacuum ultraviolet light by said oxygen atom-containing gas cannot be ignored from the perspective of its performing its function inside said near vacuum zone, in cases where said optical properties of said optical system is restored when said vacuum ultraviolet light is irradiated to said optical system or irradiated from said optical system.

The upper limit value for the partial pressure of the oxygen atom-containing gas is preferably set to a level by actually filling said near vacuum zone with a certain partial pressure of the oxygen atom-containing gas, and then measuring the quantity of vacuum ultraviolet light on said light path to check its attenuation level.

Furthermore, when the aforementioned oxygen atom-containing gas is oxygen gas, the range between the lower limit-upper limit for the gas partial pressure is 0.02 mtorr-20 mtorr (preferably 0.02 mtorr-10 mtorr), and when the gas is water vapor, 0.01 mtorr-10 mtorr (preferably 0.01 mtorr-1 mtorr).

Also, this invention is effective when the beam formed on the foregoing light path has a high photon energy and is a beam of a specific wavelength in the vacuum ultraviolet light wavelength range.

To wit, so long as the foregoing active energy is vacuum ultraviolet light with a high photon energy, the negative ions or radicals may be generated from the oxygen atom-containing gas without using a separate source of energy (e.g. heat energy, plasma energy, electrical energy, etc.) Although active seeds such as OH— and O— that were cited in Patent Publication 3 are employed, the conditions for their pressure with respect to the object of the cleaning differs from those specified in that referenced document.

SECOND PREFERRED EMBODIMENT

Further, in the second preferred embodiment, a detailed analysis of the degradation that occurs inside of light transmitting window 8 (such as an inner surface 10) was performed.

To resolve the foregoing problems, the present inventors performed detailed analyses of the degradation of light transmitting windows 8 made from fluoride materials. The device we used is shown in FIG. 14, wherein light transmitting window 8 is attached to the plasma-exposed side of flange 17 via an O-ring. MgF2 (magnesium fluoride) mono-crystal was used to fabricate light transmitting windows 8.

As a result, it was found that after irradiation by vacuum ultraviolet, the degradation in the transmission rate of light transmitting window 8 from the irradiation of vacuum ultraviolet was caused by the formation of an oxide on the surface of the MgF2 crystals (several tens of nm thick). It was also confirmed that there was a reduced presence of fluorine in this region that was several tens of nm thick on the surface of the crystal.

Further, by measurements of the spectral transmission rate to investigate any corresponding relationship that might exist between the generation of a color center on light transmitting window 8 and the degradation of the light transmission rate, it was found that the main cause of the degradation of light transmitting window 8 was not absorption by the color center, but by the defects in the fluorine generated in the surface of the crystal and the presence of oxygen.

At that point, the below described technological means was proposed for this invention that focused on the foregoing findings.

The first proposal for this invention related to optical systems comprised of fluoride materials characterized in that a protective film having a film thickness of 2-20 nm is formed at least on the light irradiation side (inner side) of said optical system to prevent the stripping of the fluorine atoms from the surface of said optical system.

The differences between the present invention and Patent Publication 4 will now be explained. Patent Publication 4 related to mercury discharge lamps having mercury sealed within their arc tube. The technology prevented the affixation of the mercury to the inner wall of the arc tube by using a 0.1 μm to 0.15 μm protective film of alumina, etc.

On the other hand, the present invention relates to the vacuum ultraviolet light range, wherein a very thin film of 2 nm-20 nm is applied to surfaces irradiated by vacuum ultraviolet light to prevent the stripping off of fluorine, this in exchange for the initial degradation in optical properties caused by the coating.

The reason for limiting the film thickness to 20 nm or under is that if it were any thicker, it would absorb the vacuum ultraviolet light to the point where it would not be able to maintain its function as an optical element.

The lower limit of 2 nm or over is that required to assure a uniform covering of the protective film upon the crystal surface. Since the molecular diameter of SiO2 or Al2O3, MgO, TiO2, or ZrO2 is approximately 1 nm, if the coating is not at least 2 molecules thick, it is not possible to deliver a uniform protective film over the surface of the crystal to achieve the function of the present invention.

When the film thickness is adequate, although the aim is to protect the surface of the optical system, since metal oxides such as SiO2 or Al2O3, MgO, TiO2, ZrO2 are not materials that inherently allow vacuum ultraviolet light to pass through, the existence of such protective films allows the absorption of the vacuum ultraviolet light within the film, and as shown in FIG. 13, diminishes the amount of ultraviolet light passing through to the base material. At the 20 nm thickness level, the transmission rate is only 10% of what it would be with no film. Not only would initial transmission rates of under 10% cause massive degradation of the optical properties of the base material, but at that level of degradation it could not function as an optical system and there would be the concern that the absorption of the ultraviolet light would degrade the protective film itself and that heat would cause it to peel off from the surface of the optical system or cause other damage. Accordingly, a thickness of 12 nm or less, preferably 10 nm or less, will maintain 30 to 40% of the optical properties of the base stock, and even in worst case scenarios, would maintain the optical properties at 10% or higher. Accordingly, due to absorption of ultraviolet light, film thicknesses of over 20 nm could not be expected to deliver the functions desired of the optical system.

Also, the oxidation of Mg occurs along with the stripping of the fluorine atoms, so a protective film of SiO2 or metal oxides having a film thickness of 2-20 nm, preferably 2-12 nm, even more preferably 2-10 nm, is preferably formed at least on the light irradiation side (inner side) of said optical system to prevent the stripping of the fluorine atoms from the surface of said optical system.

With the present proposal, it is possible to suppress both the stripping of fluorine atoms and oxidation of the surface of the foregoing optical systems, to thereby inhibit the degradation of the light transmission rate of the optical systems.

There are growth methods in the gaseous phase such as vapor deposition, ion plating, CVD and the like which can be used to form the thin-film protective film, but the especially preferred methods of film formation are the ion beam sputtering method and plasma CVD, because such methods can create a very uniform film thickness that follows along the depressions and protrusions created by the polishing process for the optical systems.

The second proposal of the present invention relates to an optical system comprising fluoride compound having surfaces facing and exposed to plasma installed in an optical equipment which has an inner zone where the plasma exists, wherein a 2 nm-20 nm protective film of a highly plasma-resistant material is formed on the surface of said fluoride compound that is exposed to the plasma.

This proposal enables the suppression of the degradation of the light transmission rate of the optical system by means of suppressing the stripping of fluorine atoms or the oxidation of the surface of the foregoing optical system otherwise caused by the plasma environment.

In this case, the foregoing protective film may be any of the metal oxides such as $SiO_2$ or $Al_2O_3$, $MgO$, $TiO_2$, $ZrO_2$, which were cited above as protective films. By forming the foregoing protective film on the optical system, wherein the optical system comprises of mono-crystal fluoride material having the crystal axis (the c axis) along the direction of the light irradiation, and the perpendicular surface of said protective film is coated by $SiO_2$ or metal oxides, it is possible to prevent the deterioration over time of the base stock from the vacuum ultraviolet light irradiation, with the initial degradation of the foregoing fluoride optical system from the coating being the trade-off.

Also, since the $SiO_2$ or other of the above cited metal oxides have a higher resistance to plasma than the fluoride compounds, it is possible to inhibit the stripping of fluorine or oxidation of metal atoms, and since they are oxides themselves, as a result, when used as a protective film for optical systems made of fluoride materials, after their initial degradation, it is possible to prevent the further degradation over time of the mother stock otherwise caused by its irradiation by vacuum ultraviolet light.

The third proposal of the present invention relates to a method to use the devices, that use the optics of the foregoing optical systems and are characterized in that applying in advance a protective film of 2 nm-20 nm of a metal oxide selected from $SiO_2$ or $Al_2O_3$, $MgO$, $TiO_2$, $ZrO_2$ to an optical system, wherein said film suppresses the stripping off of a structural element from the surface of the base stock or the oxidation of the surface of the base stock, by the irradiation of vacuum ultraviolet light over time or the plasma exposure to the base stock, and incorporating said optical system into a desired device that has vacuum ultraviolet light sources or plasma light sources which has higher photon energy than an absorption wavelength of a base stock of said optical system.

According to this invention, after the initial degradation in properties due to the foregoing metal oxide protective film, it is possible by means of this film to suppress the deterioration over time of the base stock of optical systems due to the stripping of elements from the base stock or oxidation of the surface of base stock that are caused by irradiation of vacuum ultraviolet light or exposure to plasma, which means that the optical output from the base stock will not be further diminished after operations are first initiated, which, for example makes it possible to extend the longevity of light transmitting windows of reflecting mirrors of the foregoing light output devices. This also extends the interval between replacement maintenance for the light transmitting windows or reflecting mirrors to thereby improve the operation rate for the light output devices and decrease their operating costs.

In this case, it is necessary only to use a light source that will provide adequate light output to compensate for the initial degradation of the optical system due to the foregoing protective film as a means to make it possible to increase the longevity of the device, to thereby not cause the reduced light transmission of the overall system (transmission rate, reflection rate).

To wit, when the optical system is coated with the foregoing protective film in advance to suppress its deterioration over time due to irradiation by vacuum ultraviolet light or exposure to plasma, which would otherwise cause elements from its base stock to be stripped away or oxidized over time, it is only necessary to supplement the light output for the device to compensate for the initial deterioration that is caused by the foregoing protective film. For example, in a light output device which is used as a light source for measurements, by using the above described optical systems coated on at least one side, such as coated light transmitting windows or reflecting mirrors, it is possible to obtain stable light output over the longer term, and to employ the light output device for measurement applications and maintain stable light transmission rates that do not deteriorate so as to stabilize the control operations and measurement sensitivity of the device.

DETAILED DESCRIPTION OF THE INVENTION

First Preferred Embodiment

The first Preferred embodiment implementations for the present invention in suppressing or removing carbon adherents from outer surface 11 of light transmitting window 8 shall be described in the Examples below with reference to the figures. In addition, preferred embodiments for suppressing or removing carbon adherences from optical systems located in vacuum zone 14 will be explained as well with reference to the figures.

The present invention is not confined to these embodiment examples, and it may also be effectively applied to lamps or laser apparatus that produce light by electrical discharge or by heating.

Example 1

Figure 1:
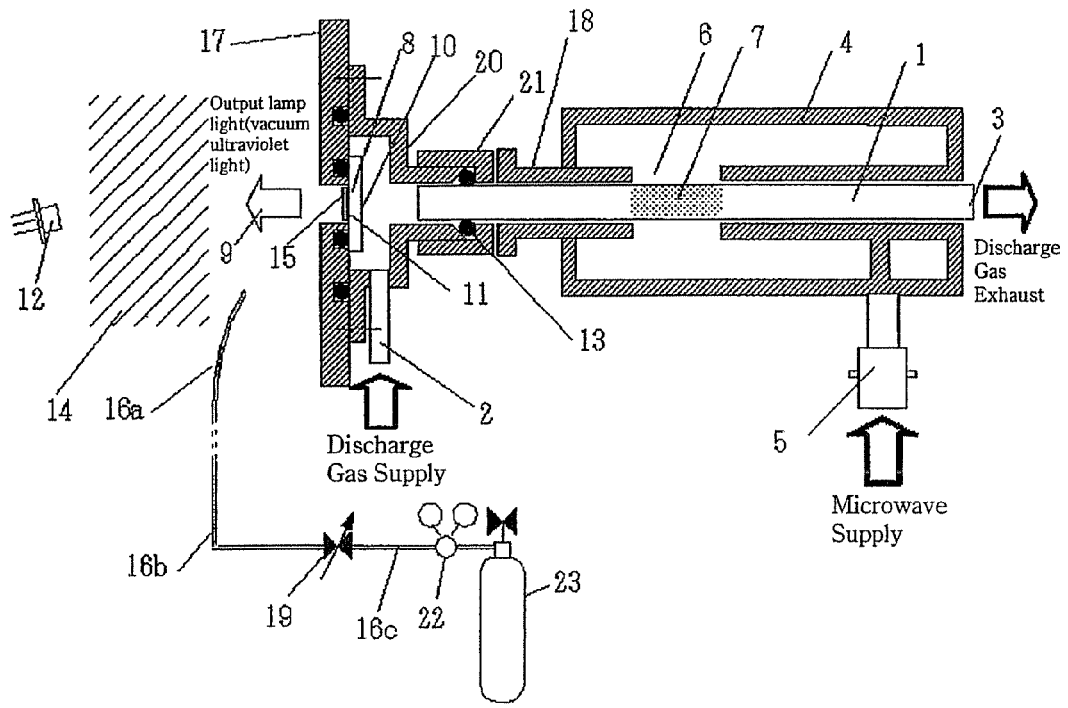
FIG. 1 is a diagram showing the structure of a microwave excited hydrogen ultraviolet lamp used to explain the first example of the first preferred embodiment according to the present invention.

FIG. 1 is a diagram used to explain the structure of the microwave-excited hydrogen ultraviolet lamp used in the first example of the first preferred embodiment according to the present invention.

The retaining member (flange) 17 where light transmitting window 8 is attached is disc shaped and its center is aligned with the bore of discharge tube 1, and it contains an opening which is of a larger diameter than the inside diameter of the discharge tube. Window flange 17 includes an O-ring groove to create a seal over the opening for light transmitting window 8, and there is also a hollow lid-shaped jig 20, bolt holes to affix it, and an O-ring groove which connects to discharge tube 1 to maintain a vacuum with window flange 17.

The internal structure of jig 20 employs two-stage concentric circles and bounds the space for housing light transmitting window 8 and the space encompassed by discharge tube 1. On the end that encompasses discharge tube 1 the face has been cut to an angle where O-ring 13 is held in place by pressure. Threads not shown in the figure are further cut into the outside circumferential surface of this end, and the vacuum boundary for discharge tube 1 is formed by tightening cap 21 over the cylindrical opening with a seal by O-ring 13. Window attachment Flange 17, jig 20 and cap 21 are all made from metal; in general, low contamination stainless steel or aluminum would be used, but the material is not limited to these metals.

The operation of the microwave-excited hydrogen ultraviolet lamp of the above described structure will now be explained. First, from the discharge gas supply opening 2 in discharge tube 1, hydrogen discharge gas diluted with helium at 1/100 is fed in at 20 sccm. The discharge gas is expelled through exhaust opening 3 by a vacuum pump (not shown). By adjusting the aperture of a valve (not show) installed between discharge gas exhaust opening 3 and the vacuum pump, it is possible to adjust the exhaust conductance to maintain the inside of discharge tube 1 at about 5 torr (665 Pa). The reason for creating the flow of discharge gas in the direction from the light transmitting window side toward discharge tube 1 is to do everything possible to reduce sources of contamination on said window 8 due to materials being generated inside discharge 1 by the discharge plasma.

Next, 2.45 GHz, 50 W microwaves are supplied from microwave supply connector to microwave oscillator 4. The microwaves may be supplied either continuously or intermittently. A regulator (not shown) installed in the electrical power line connected to the microwave power source and microwave oscillator may be used to adjust the microwave power output between the power source and load (discharge plasma) in generating discharge plasma 7 in discharge tube 1. The hydrogen atoms excited by discharge plasma 7 irradiate light in the 103 nm and 122 nm vacuum ultraviolet light wavelengths. Since $MgF_2$ was used as the material for light transmitting window 8, as will be detailed below, the 103 nm light rays are absorbed by the $MgF_2$ and only the 122 nm wavelength vacuum ultraviolet light is passed into vacuum zone 14 as output lamp light (vacuum ultraviolet light) 9.

In this case the opening in the mounting Flange 17 for light transmitting window 8 is Φ8 mm, so the output into vacuum zone 14 is Φ8 mm flux of light.

$MgF_2$ (magnesium fluoride) mono-crystal was used for light transmitting window 8, with the crystalline axis (c axis) aligned to be perpendicular to the surface of the light transmitting window. The crystal size was 0.5 inch Φ (12.7 mm Φ)×1 mm thick. The crystal used was UV grade from Ohyo Koken Kogyo Co., Ltd. A plurality of crystals from the same lot were obtained, and they were sorted to match their crystal quality and surface condition to eliminate any variation within the lot to the degree possible in order to be able to verify just the effects of the protective film.

Also, photodiode 12 was positioned to receive lamp output light 9 as a means of monitoring the amount of light output from said lamp.

Oxygen gas was supplied to vacuum zone 14 using the below described method while regulating the gas to the prescribed partial pressure.

Oxygen gas cylinder 23 (made by Nippon Sanso Corporation) was filled with pure oxygen (purity 4N) and connected to regulator 22. After adjusting the gas pressure to 0.1 kg/cm², and adjusting the aperture of variable leak valve 19 connected via pipe 16c, the gas passed through pipe 16b on the atmospheric side, and then passed via seal mechanism (not show) and was fed into vacuum zone 14 from pipe 16a inside of vacuum zone 14. The amount supplied was approximately 1 sccm. Vacuum zone 14 was evacuated by means of a turbo molecular pump (evacuation rate of 50 L/min, model TP-50 made by Mitsubishi Heavy Industries, Ltd.), and was connected downstream to a dry pump (not shown). In this case, the oxygen gas partial pressure inside the vacuum zone was balanced at 1 mtorr (1 millitorr). Thus, the conditions were such that the partial pressure of the oxygen gas inside vacuum zone 4 was on the order of at least 1 mtorr (and under 10 mtorr).

Experiments were also performed with the valve aperture adjusted to provide 5 mtorr, 2 mtorr and 0.1 mtorr, but as will be explained later, similar effectiveness was obtained for carbon removal.

The variable leak valve mentioned in the explanation is not an item with special specifications; it is merely a mechanism to make fine aperture adjustments, and any such mechanism of whatever name may be employed.

Next, photodiode 12 was employed to measure the changes over time of the amount of light output from the microwave-excited hydrogen ultraviolet lamp of the aforementioned structure.

First, discharge plasma 7 was used to excite the hydrogen atoms to generate the vacuum ultraviolet light for 90 hours (about 4 days). Next, as a control, the test was repeated but without the oxygen gas supply, to wit, the foregoing turbo molecular pump was operated to maintain a similar environment (0.001 mtorr), and then the results were compared.

The results indicated that when the oxygen gas was fed during lamp operations, there was no observable degradation of the transmission through light transmitting window 8 rate due to carbon accumulation. On the other hand, in the control, if the original light transmission rate is taken to be 100%, the transmission rate over the course of the test fell to 35% due to the accumulation of carbon on light transmitting window 8.

FIG. 1 shows the carbon 15 that was observed in the control experiment to accumulate and adhere in a film like manner. When the lamp was operated with a flow of oxygen gas, the carbon 15 shown in FIG. 1 did not adhere to light transmitting window 8.

When light transmitting windows 8 were observed with an optical microscope after having been used, no adherents were noted on the one used with the oxygen gas feed, but in the control sample, material adhered in a film-like manner over the central Φ8 mm range through which the vacuum ultraviolet light was transmitted. It was possible to peel off the adhering material by scraping plastic forceps across outer surface 11, and the material was found to be a film like material with weak binding force adhering to outer surface 11.

Next, an elemental analysis was performed on the adhering material. Elemental analysis was performed on outer surface 11 of light transmitting window 8 for the control sample using EPMA (electron probe X-ray micro analyzer (the JXA-8200 made by Nippon Denshi using analytical conditions of acceleration voltage 15 kV, irradiation current 5E-8A, measurement methods: qualitative analysis, line analysis, and mapping analysis. Results indicated that there was significant carbon detected in the central Φ8 mm area of outer surface 11 of light transmitting window where the ultraviolet was transmitted. The ring shaped area outside the central Φ8 mm region was in the shadow of Flange 17, and accordingly, was a region through which no ultraviolet light was transmitted, and although EPMA analysis revealed contamination level carbon in this area, there was no significant carbon adherence. What is meant here by 'contamination level' in the EPMA analysis is just a weak signal level for carbon such as obtained when analyzing a thoroughly cleaned surface. The act of irradiating a clean surface with an electron beam unavoidably causes carbon to adhere, and this signal level is based upon that adhering carbon. Accordingly, the contamination level of the analytical apparatus itself determines the lower measurement limit for EPMA analysis. The signal level from the central Φ8 mm range through which the ultraviolet light was transmitted, when compared to the signal level for contamination, was significantly higher, and that finding confirmed that carbon had accumulated on outer surface 11 of the light transmitting window in a film-like manner.

Figure 7:
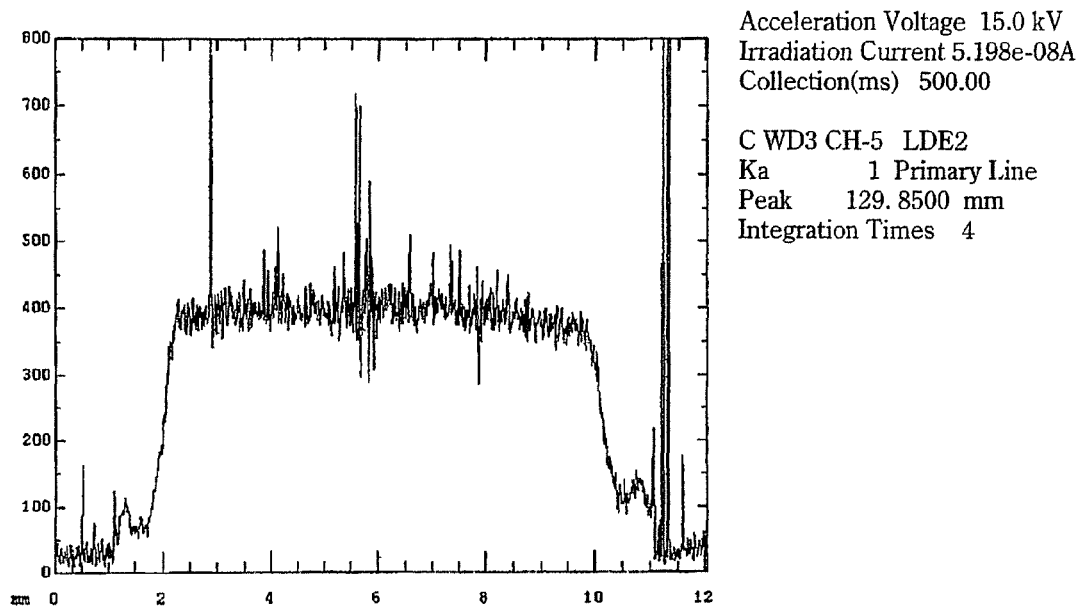
FIG. 7 is EPMA analytical results for carbon adhesion to the light transmitting window according to the first preferred embodiment of the present invention.

FIG. 7 shows the results of line analysis of the control experiment using EPMA. The units on the horizontal axis in FIG. 7 are millimeters, which express the analytical position upon the diameter of the MgF$_2$ crystal; the line analysis on said crystal was performed from edge-to-edge.

The vertical axis expresses the carbon signal strength detected at the spectrum generation crystal LDE2. The main analytical conditions are listed outside of the graph of FIG. 7.

From FIG. 7, it is apparent that there was a significantly high signal strength from the carbon in the Φ8 mm region through which the ultraviolet light was transmitted, which clearly indicated the film like adhesion in the central Φ8 mm region.

On the other hand, no significant carbon signals beyond the contamination level were detected from the surface of the light transmitting window after the lamp was operated under an oxygen flow.

As described above, by operating the lamp with an oxygen gas feed, it was possible to prevent or suppress carbon buildup on light transmitting window 8.

Implementing this countermeasure makes it possible to suppress the decline of the transmission rate through the light transmitting window to thereby reduce the cost of maintenance operations to replace the window as well as reduce the operational down time for the lamp.

This embodiment took up the light transmitting window as an example, but the present embodiment may be similarly applied to apparatus employing light reflecting mirrors (windows). Examples of such light reflecting mirrors are those reflecting mirrors used with laser oscillators and lamp focusing mirrors. The embodiments described below also similarly apply to the case of light reflecting mirrors.

Example 2

Figure 2:
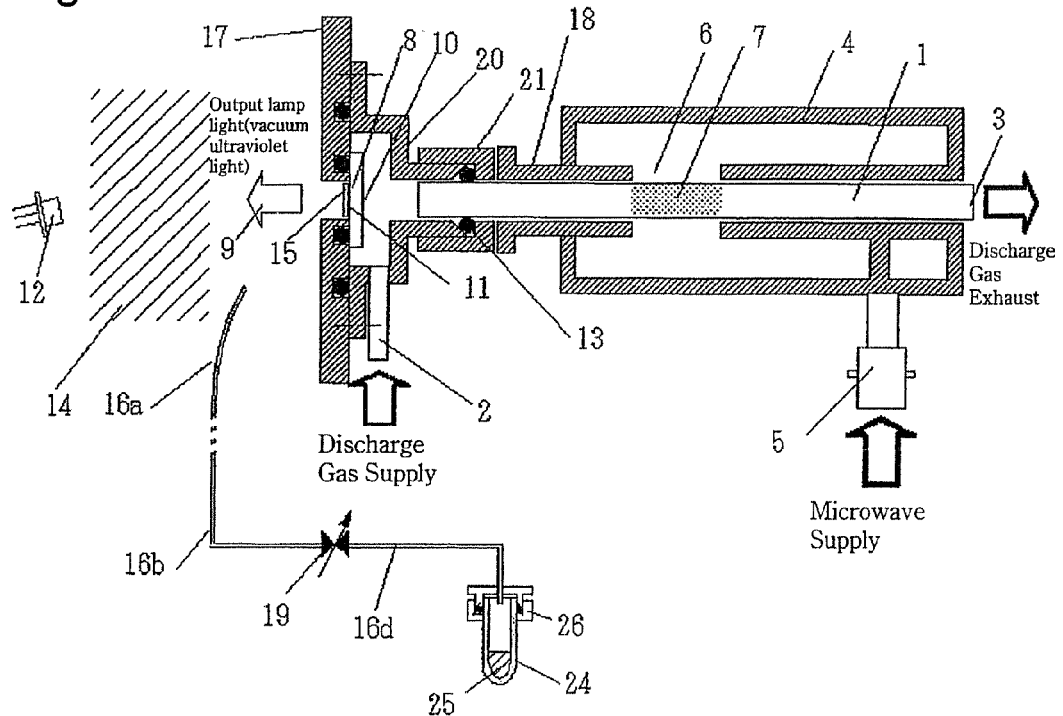
FIG. 2 is a diagram showing the structure of a microwave excited hydrogen ultraviolet lamp used to explain the second example of the first preferred embodiment according to the present invention.

FIG. 2 is a diagram showing a microwave excited hydrogen ultraviolet lamp that will be used to describe the second example of the first preferred embodiment according to the present invention. Further elaboration of structural and operational elements that are similar to those of Example 1 will be omitted. The specifications of light transmitting window 8 were the same as those explained for Example 1. Further, a photodiode 12 was positioned to receive the light output of lamp emitted light 9 as a means of monitoring the amount of light output from said lamp.

Water vapor was supplied to vacuum zone 14 using the following method, and it was adjusted to a specific gas partial pressure. Glass tube 24 (tube diameter Φ 6 mm), which was filled with 1 mL of water 25 (pure water that was distilled, ion-exchanged processed and filtered) was connected with tube 16d via flange 17. The structure of flange 17 incorporated an O-ring to seal the glass tube off from the atmosphere, and all of the atmospheric components were exhausted from the tube in advance. Water 25 was maintained at room temperature (25° C.) and the inside vapor pressure was 24 torr (computed value). This vapor pressure was supplied at its primary vapor pressure via tube 16d, and after adjusting the aperture of variable leak valve 19, it passed through tube 16b on the atmosphere side, via a seal mechanism (not shown), and into vacuum zone 14 via tube 16a. The amount of the supply was approximately 0.1 sccm. Vacuum zone 14 was evacuated by means of a turbo molecular pump (evacuation rate 50 L/min, model TP-50 made by Mitsubishi Heavy Industries, Ltd., not shown in figure), and dry pump (not shown) downstream. In this case, the water vapor partial pressure was balanced inside the vacuum zone at 0.1 mtorr (0.1 millitorr). Accordingly, conditions were such in vacuum zone 14 that the water vapor partial pressure was at least on the order of 0.1 mtorr, (but less than 1 mtorr).

Experiments were also performed using water vapor partial pressures of 1 mtorr and 0.01 mtorr, which where achieved by adjusting the valve aperture, but as will be described later, similar effects in carbon removal were obtained.

Next, the changes over time of the amount of light output from the above-described microwave excited hydrogen ultraviolet lamp were measured using photodiode 12.

First, hydrogen atoms were excited by discharge plasma 7 to generate vacuum ultraviolet light for 90 hours (about 4 days). Next, the lamp was operated without supplying the water vapor, to wit, the experiment was implemented using the foregoing turbo molecular pump to maintain an pressure environment of 0.001 mtorr, and then the results of the two tests were compared.

Results indicated that when the lamp was operated with a supply of water vapor, no degradation in transmission through light transmitting window 8 due to carbon buildup could be observed. On the other hand, in the control experiment, if the initial level of light transmission was rated at 100%, the adhesion of carbon caused the transmission rate to drop to 35% over the period measured.

The carbon 15 shown in FIG. 2 shows the film-like adhesion of carbon that was observed in the control, but when water vapor was supplied during lamp operation, there was none of the adhesion of carbon 15 on light transmitting window 8 as shown in FIG. 2.

When outer surface 11 of light transmitting window 8 was observed using an optical microscope after it had been used, no adherents were observed for the window used while water vapor was being supplied to the lamp, but on the control window, the central Φ8 mm region through which the vacuum ultraviolet light was transmitted exhibited substance adhering in a film like manner. When plastic forceps were used to scrape outer surface 11, it was possible to scrape away the adhering material, which was found to be a weakly bound film-like substance adhering to outer surface 11.

At this point, elemental analysis was performed on the adhering material. The results of elemental analysis by EPMA were similar to those explained for Example 1.

As has been detailed above, when the lamp was operated with a feed of water vapor, it was confirmed that the adhesion of carbon to light transmitting window was prevented or suppressed.

This countermeasure makes it possible to inhibit the decline in the light transmission rate of the light transmitting window, to thereby reduce maintenance costs associated with window replacement, and reduce operational downtime of the lamp due to maintenance.

Example 3

Figure 3:
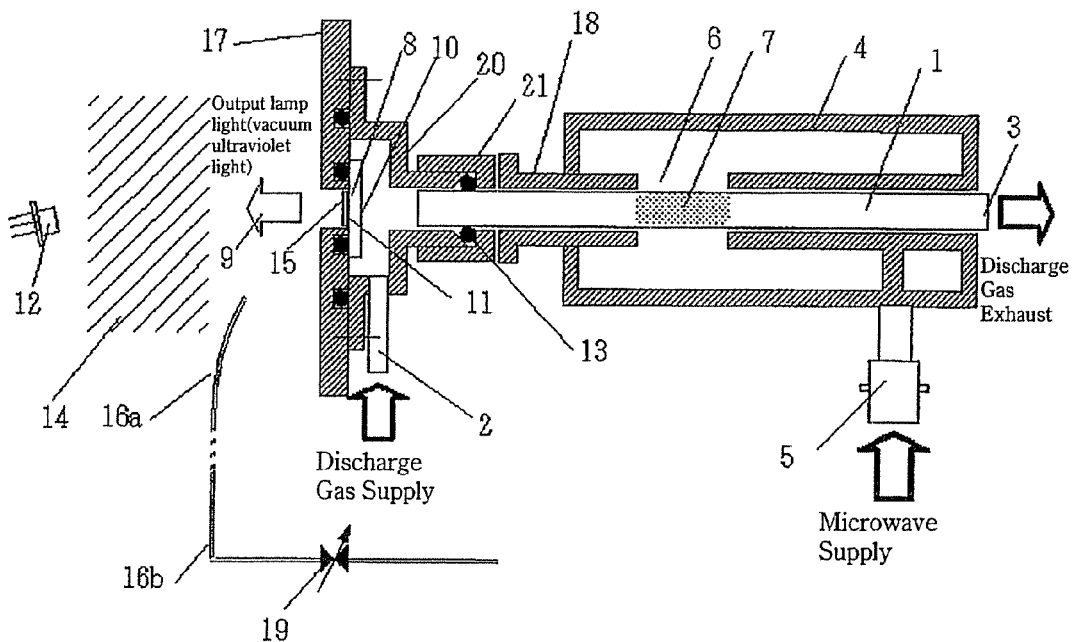
FIG. 3 is a diagram showing the structure of a microwave excited hydrogen ultraviolet lamp used to explain the third example of the first preferred embodiment according to the present invention.

FIG. 3 shows a diagram of a microwave excited hydrogen ultraviolet lamp which will be used to explain the third example of the first preferred embodiment according to this invention. Further elaboration of structural and operational elements that are similar to those of Example 1 will be omitted. The specifications of light transmitting window 8 were the same as those explained for Example 1. Again, a photodiode 12 was positioned to receive the light output of lamp emitted light 9 as a means of monitoring the amount of light output from said lamp.

Atmospheric components were supplied to vacuum zone 14 using the method specified below and these were adjusted to a specific gas partial pressure.

Atmospheric components were supplied to vacuum zone 14 by means of a tube open to the atmosphere which, after adjusting the aperture with variable leak valve 19, allowed the atmospheric components to travel via tube 16b, and through a seal mechanism (not shown) to be introduced into vacuum zone 14 via tube 16a. The amount supplied was approximately 1 sccm. Vacuum zone 14 was evacuated by means of a turbo molecular pump (evacuation rate 50 L/min, model TP-50 made by Mitsubishi Heavy Industries, Ltd., not shown in figure), and dry pump (not shown) downstream. In this case, the atmospheric components were balanced inside the vacuum zone at 1 mtorr (1 millitorr). Accordingly, conditions were such in vacuum zone 14 that the atmospheric components partial pressure was at least on the order of 1 mtorr, (with 0.2 mtorr of oxygen alone).

A valve aperture adjustment was also made to generate a partial pressure of 0.1 mtorr (with 0.02 mtorr of oxygen alone), but as will be described later, the effectiveness in carbon removal was similar.

Next, photodiode 12 was used to measure the changes over time of light output during the operation of the microwave excited hydrogen lamp with the above described structure.

First, hydrogen atoms were excited by discharge plasma 7, and vacuum ultraviolet light was generated for 90 hours (about 4 days). Next, as a control, the atmospheric components were not supplied during operations, and the foregoing turbo molecular pump was used to create an environment of 0.001 mtorr, and then the results of the two tests were compared.

When the lamp was operated with the supply of atmospheric components, no diminishment of light transmission through light transmitting window 8 due to carbon buildup could be observed. However, in the control test, carbon buildup caused the light transmission through light transmitting window 8 to decline from an initial value of 100% to a transmission rate of 35%.

The carbon 15 shown in FIG. 3 reflects the film-like adhesion of carbon that was observed in the control, but when atmospheric components were supplied during lamp operation, there was none of the adhesion of carbon 15 on light transmitting window 8 that is shown in FIG. 3.

When outer surface 11 of light transmitting window 8 was observed using an optical microscope after it had been used, no adherents were observed for the window used while atmospheric components were being supplied to the lamp, but on the control window, the central Φ8 mm region through which the vacuum ultraviolet light was transmitted exhibited substance adhering in a film like manner. When plastic forceps were used to scrape outer surface 11, it was possible to scrape away the adhering material, which was found to be a weakly bound film-like substance adhering to outer surface 11.

At this point, elemental analysis was performed on the adhering material. The results of elemental analysis by EPMA were similar to those explained for Example 1.

As has been detailed above, when the lamp was operated with a feed of atmospheric components, it was confirmed that the adhesion of carbon to light transmitting window was prevented or suppressed.

This countermeasure makes it possible to inhibit the decline in the light transmission rate of the light transmitting window, to thereby reduce maintenance costs associated with window replacement, and operational downtime of the lamp due to maintenance.

Example 4

Figure 4:
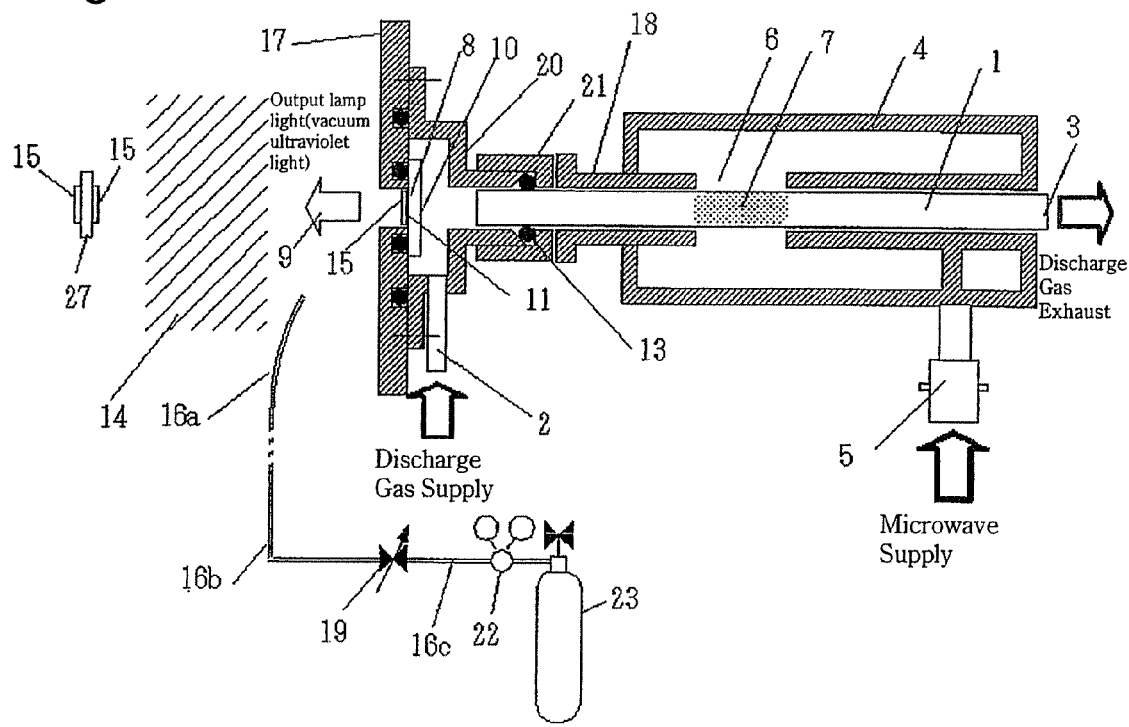
FIG. 4 is a diagram showing the structure of a microwave excited hydrogen ultraviolet lamp used to explain the forth example of the first preferred embodiment according to the present invention.

FIG. 4 shows the structure of a microwave excited hydrogen ultraviolet lamp used to explain the fourth example of the first preferred embodiment according to the present invention where the method for removing carbon adhering to optical systems located in vacuum zone 14 using output light will be described. Further elaboration of structural and operational elements that are similar to those of Example 1 will be omitted. The specifications of light transmitting window 8 were the same as those explained for Example 1.

Optical element 27 in FIG. 4 is positioned to be irradiated by lamp emitted light 9. Carbon 15 was already adhering to both sides of optical element 27, and was produced by optical element 27's irradiation by vacuum ultraviolet light 9 while organic gases were present within vacuum zone 14. Since carbon 15 was adhering, the transmission rate of optical element 27 had degraded and maintenance was required. The reason why optical 27 had reached this state was because the lamp had been operated in a vacuum state.

An interference filter for vacuum ultraviolet light will be used here as an example of an optical element 27, used to describe the carbon removal. The interference filter for vacuum ultraviolet light consisted of a $MgF_2$ substrate with a coating of a multi-layered optical film on its surface. This is a conventional structure for optical parts such as this interference filter. This interference filter functions as a band pass filter since it allows only light of a specific wavelength band to pass through, but when carbon 15 adheres to its surface, its transmission rate as an interference filter declines, and its function as an optical element is thereby degraded. Accordingly, at a certain stage of diminished transmission rate, it is necessary to either remove the carbon or to replace the interference filter. In general, because of the delicate nature of optical filters such as interference filters having optical film coatings, cleaning them is very difficult. The cleaning might change the properties of the optical film, and it is easy to introduce such defects as scratches during cleaning. Thus, there is essentially no effective cleaning method available, and one must elect to replace the part. However, in general, interference filters are expensive parts and cost becomes a problem. In Example 4, to prove the effectiveness of the invention, the lamp was operated without a gas supply until the transmission rate of the interference level had declined to 50% (from an original value of 100%) to intentionally degrade the transmission rate by half, and then the optical element 27 was positioned within vacuum zone 14.

The method of Example 1 was used to supply oxygen gas to vacuum zone 14 under conditions where the partial pressure of the oxygen gas in vacuum zone 14 was maintained at 1 mtorr. Experiments were also conducted by adjusting the valve aperture to deliver 10 mtorr, 5 mtorr, 2 mtorr, 0.1 mtorr, and 0.05 mtorr, but as will be explained below, similar effects in carbon removal were obtained.

Next, discharge plasma was used to excite the hydrogen atoms to cause vacuum ultraviolet light to be emitted for 90 hours (about 4 days). When oxygen gas was supplied during lamp operations, adhering carbon 15 was removed from the surface of optical element 27, and the transmission rate of optical element 27 was restored to virtually its original state. When the surface of optical element was observed under an optical microscope, no adherents were noted.

As explained above, it was possible to clean off the carbon adhering to optical element 27 by operating under a feed of oxygen gas.

This method makes it possible to inhibit the decline in the light transmission rate of the optical element, to thereby reduce maintenance costs associated with optical element replacement, and operational downtime of the lamp due to maintenance.

Example 5

Figure 5:
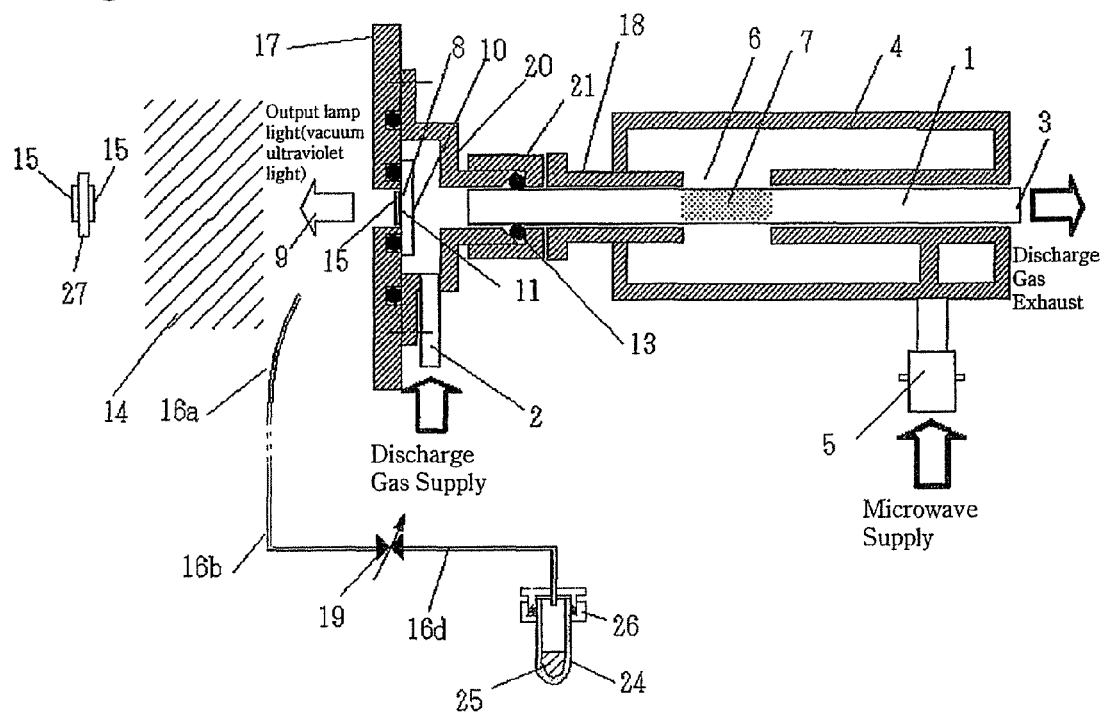
FIG. 5 is a diagram showing the structure of a microwave excited hydrogen ultraviolet lamp used to explain the fifth example of the first preferred embodiment according to the present invention.

FIG. 5 shows the microwave excited hydrogen ultraviolet lamp structure used to explain the fifth example of the first preferred embodiment according to this invention, wherein the removal of carbon adhering to an optical element located in vacuum zone 14 by using lamp light emissions will be described. Further elaboration of structural and operational elements that are similar to those of Example 1 will be omitted. The specifications of light transmitting window 8 were the same as those explained for Example 1.

In FIG. 5, optical element 27 is positioned to receive the light emitted by lamp 9. Further explanation of the optical element will be omitted since it is similar to that used in Example 4.

In Example 5, to verify the effects the effectiveness of the invention, the lamp was operated without a gas supply until the transmission rate of the interference level had declined 50% (from an original value of 100%) to intentionally degrade the transmission rate by half, and then the optical element 27 was positioned within vacuum zone 14.

The method of Example 2 was used to supply water vapor to vacuum zone 14 under conditions where the partial pressure of the water vapor in vacuum zone 14 was maintained at 1 mtorr. Experiments were also conducted by adjusting the valve aperture to deliver 5 mtorr, 2 mtorr, 0.01 mtorr, and 0.005 mtorr of water vapor partial pressure, but as will be explained below, similar effects in carbon removal were obtained.

Next, discharge plasma was used to excite the hydrogen atoms to cause vacuum ultraviolet light to be emitted for 90 hours (about 4 days). When water vapor was supplied during lamp operations, adhering carbon 15 was removed from the surface of optical element 27, and the transmission rate of optical element 27 was restored to virtually its original state. When the surface of optical element was observed under an optical microscope, no adherents were noted.

As explained above, by operating under a feed of water vapor, it was possible to clean off carbon 15 adhering to optical element 27.

This method made possible the restoration of the degraded optical element to thereby reduce maintenance costs associated with the replacement of the optical element, as well as reduce lamp down time due to maintenance.

Example 6

Figure 6:
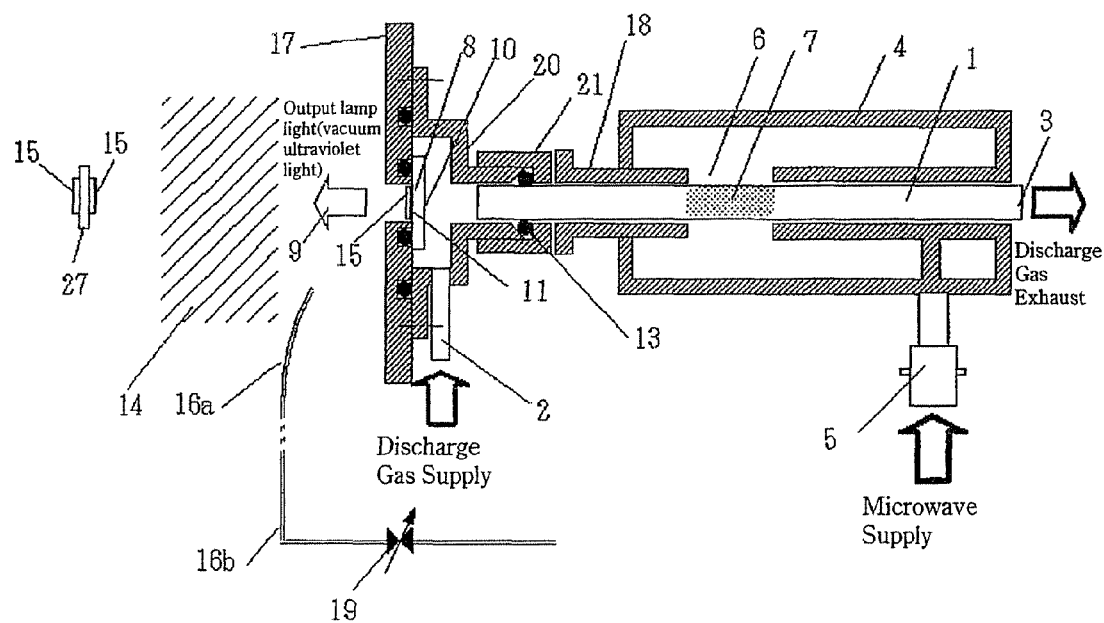
FIG. 6 is a diagram showing the structure of a microwave excited hydrogen ultraviolet lamp used to explain the sixth example of the first preferred embodiment according to the present invention.

FIG. 6 shows the microwave excited hydrogen ultraviolet lamp structure used to explain the sixth example of the first preferred embodiment according to this invention, wherein the removal of carbon 15 adhering to an optical element 27 located in vacuum zone 14 by using lamp light emissions will be described. Further elaboration of structural and operational elements that are similar to those of Example 1 will be omitted. The specifications of light transmitting window 8 were the same as those explained for Example 1.

In FIG. 6, optical element 27 is positioned to receive the light emitted by lamp 9. Further explanation of the optical element will be omitted since it is similar to that used in Example 4.

In Example 6, to verify the effects the effectiveness of the invention, the lamp was operated without a gas supply until the transmission rate of the interference level had declined 50% (from an original value of 100%) to intentionally degrade the transmission rate by half, and then the optical element 27 was positioned within vacuum zone 14.

The method of Example 3 was used to supply atmospheric components to vacuum zone 14 under conditions where the partial pressure of the atmospheric components in vacuum zone 14 was maintained at 1 mtorr.

Experiments were also conducted by adjusting the valve aperture to deliver 2 mtorr, and 0.1 mtorr of atmospheric components' partial pressure, but as will be explained below, similar effects in carbon removal were obtained.

Next, discharge plasma was used to excite the hydrogen atoms to cause vacuum ultraviolet light to be emitted for 90 hours (about 4 days). When atmospheric components were supplied during lamp operations, adhering carbon 15 was removed from the surface of optical element 27, and the transmission rate of optical element 27 was restored to virtually its original state. When the surface of optical element was observed under an optical microscope, no adherents were noted.

As explained above, by operating under a feed of atmospheric components, it was possible to clean off carbon 15 adhering to optical element 27. This method made possible the restoration of the degraded optical element to thereby reduce maintenance costs associated with the replacement of the optical element, and lamp down time due to maintenance.

Second Preferred Embodiment

The second preferred embodiment of this invention will be explained below as well with reference, in which a protective film is coated on the light transmitting window for the purpose of preventing or suppressing the degradation of the window. This invention is, however, not limited to this configuration, but it can naturally apply to the lamps that emit luminescent generated by electric discharging or heating, and laser devices if applicable.

Figure 8:
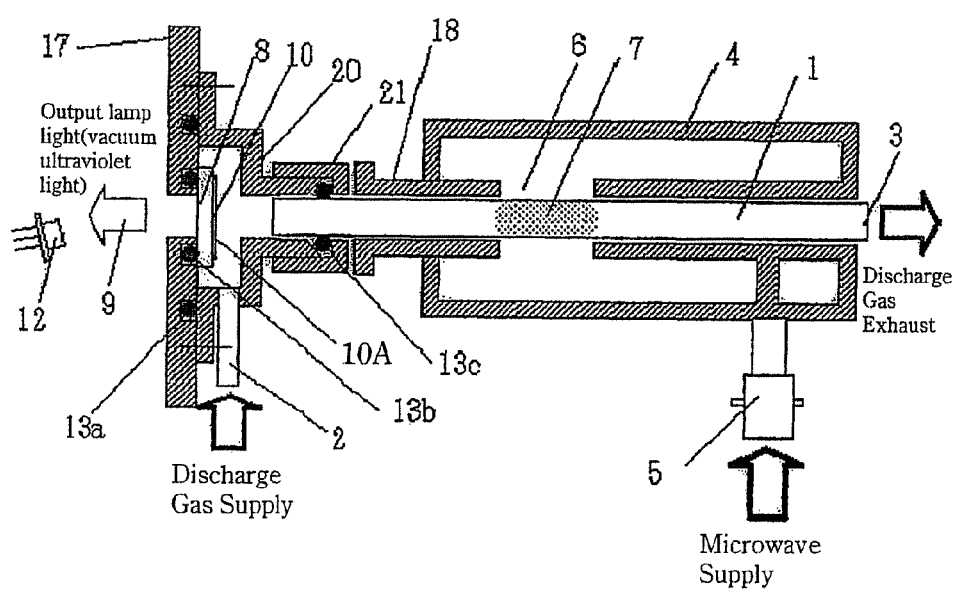
FIG. 8 is a diagram showing the structure of a microwave excited hydrogen ultraviolet lamp used to explain the second preferred embodiment according to the present invention.

FIG. 8 shows a diagram of a microwave-excited hydrogen ultraviolet lamp; it will be used to explain embodiments 1-3 of this invention. Flange 17 for light transmitting window 8 is disc-shaped and its center aligns with the bore line of discharge tube 1 and contains an opening with a diameter that is larger than that of the discharge tube. Window flange 17 contains an O-ring groove 13b as a means to seal light transmitting window 8 over the foregoing opening, and a hollow, lid-shaped jig 20 that includes bolt holes for attachment and an O-ring groove 13a is employed to attach discharge tube 1 and it further allows flange 17 to maintain a vacuum.

The inside surface structure of jig 20 consists of two-step concentric hollow cylinders that envelop the space that houses light transmitting window 8 and discharge tube 1. On the end surface of the side that encases discharge tube 1 is O-ring 13c, which is installed in a diagonally cut surface that corresponds to the ring diameter. Further, threads (not shown) are cut on the outside circumferential surface of this end to allow installation a cylindrical, open ended cap 21, which holds O-ring 13c in place and defines the vacuum boundaries for discharge tube 1. The window flange 17, jig 20 and cap 21 are all made from metal, in general stainless steel or aluminum, which are not good sources of contamination, would be used, but the material is not confined to these metals.

Now the operation of the microwave-excited hydrogen ultraviolet lamp with the above described structure will be explained. First, a 1/100 dilution of hydrogen in helium gas is supplied through discharge gas supply opening 2 to discharge tube 1 at the rate of 20 sccm. The discharge gas is exhausted by means of a vacuum pump (not shown) through discharge gas exhaust opening 3, and the adjustment of the aperture of a valve (not show) that lies between discharge gas exhaust opening 3 and the vacuum pump, controls the exhaust conductance to maintain the inside of discharge tube 1 at about 5 torr (665 Pa). The reason for flowing the discharge gas from the side of light transmitting window 8 toward discharge tube 1 is to make every effort to exhaust any material generated inside discharge tube 1 by discharge plasma 7 in the direction away from light transmitting window 8 so as to reduce sources of contamination to said window 8.

Microwave oscillator tuner 18 is cylindrical in shape and it is a structural element of the microwave oscillator that allows the adjustment of the microwave electromagnetic field distribution inside the microwave oscillator; its inside diameter is the encasement of discharge tube 1. Further its structure is such that it can be inserted while aligned in the axial direction from the end surface of microwave oscillator 4 and it can slide in the axial direction while maintaining electrical conductivity with microwave oscillator 4. Tuner 18 is formed from copper or brass, the same material used for microwave oscillator 4. The function of said tuner 18 to adjust the microwave electromagnetic field distribution, which generates plasma 7 based upon the depth to which it is inserted so as to concentrate the generation of microwaves in the center 6.

Next, 2.45 GHz, 50 W microwaves are supplied from microwave supply connector 5 to microwave oscillator 4. The supply of the microwaves may be either continuous or intermittent. A regulator (not show) incorporated midway in the electrical power transmission line that connects the microwave power source with microwave oscillator. It can be adjusted to control the microwave power between the power source and the load (discharge plasma) to generate discharge plasma 7 inside of discharge tube 1. Hydrogen atoms excited by discharge plasma 7 generate vacuum ultraviolet light beams at the 103 nm and 122 nm wavelengths; they pass through light transmitting window 8 and allow irradiated lamp light 9 to be delivered to the outside.

$MgF_2$ (magnesium fluoride) mono-crystal was used to fabricate light transmitting window 8 and its crystal axis (c axis) was aligned to be perpendicular to the surface of the light transmitting window.

A thin film coating of $Al_2O_3$ (alumina) had been previously applied as protective film 10A to surface 10 of light transmitting window 8 before installing it in the position shown in FIG. 8. The coating was applied using the ion beam sputtering type of film-forming method.

The ion beam film forming method will now be explained. An Ar gas environment maintained at a pressure of 0.1 Pa was used as the film forming gas, and a 3 inch $\phi$ sintered $Al_2O_3$ target (purity 4N) was bombarded using an Ar ion acceleration voltage of 20 kV to sputter the $Al_2O_3$ from the target onto surface 10 of light transmitting window 8 to create the film. The film thickness control was performed using a quartz oscillator, by creating a calibration curve in advance that detailed the relationship between the amount of variation in the number of quartz crystal oscillations and the thickness of the film. By so doing, the film was formed to the desired thickness by varying oscillation time correspondingly.

The coating method used to generate protective film 10A is not confined to the above described ion beam sputtering film forming method. It is possible to produce films of the desired composition by appropriate selection of the method and device. Other possible methods include gas phase methods such vapor deposition, ion plating, CVD, etc.

The appropriate film thickness range for protective film 10A is determined based upon surface coverage situation for the optical systems and the transmission required for the 122 nm vacuum ultraviolet light.

Figure 13:
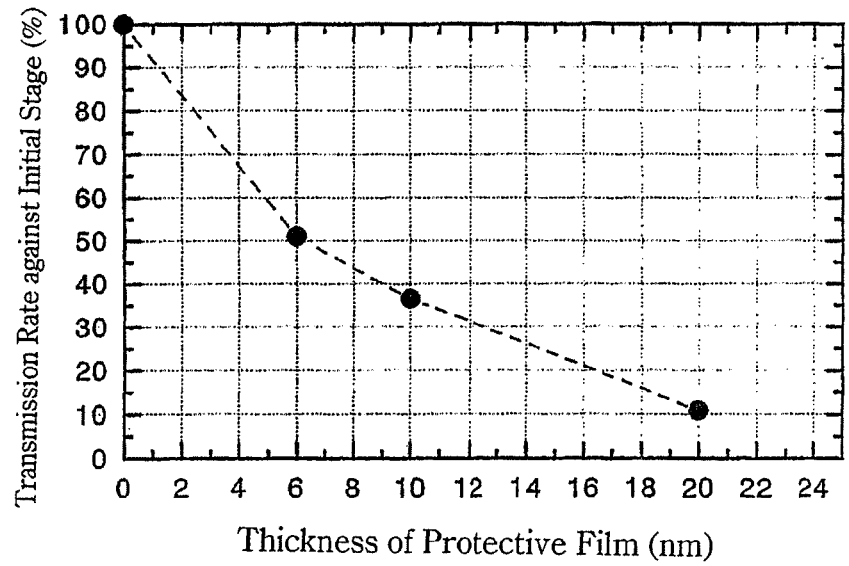
FIG. 13 is a graph showing the relationship between the light transmission rate of an optical system in its initial state with that showing various thicknesses of a protective film.
Figure 14:
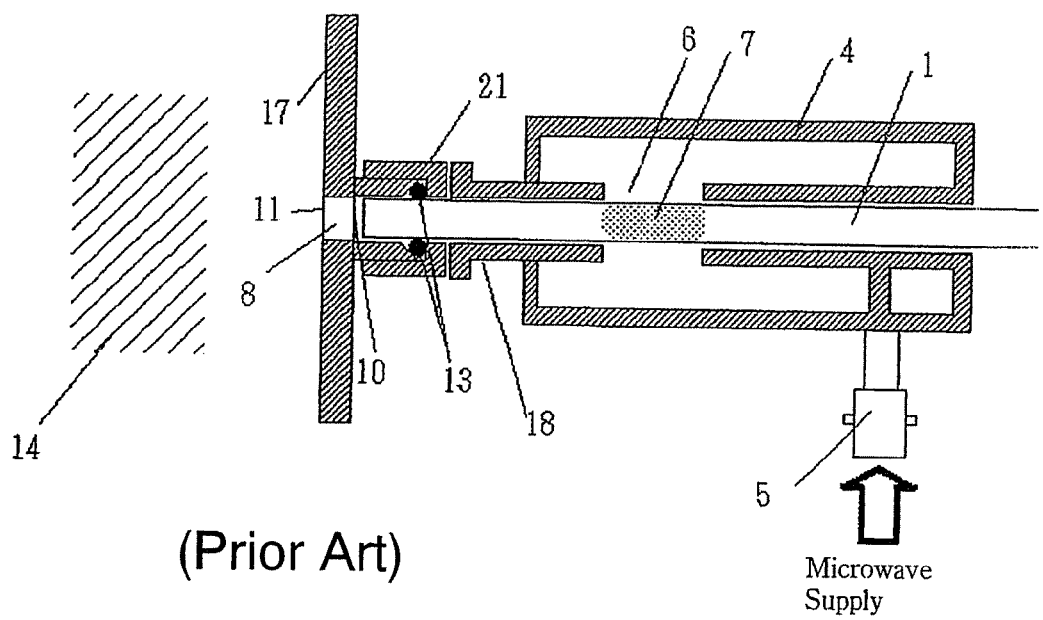
FIG. 14 is a diagram showing a conventional microwave-excited hydrogen ultraviolet lamp according to the prior art.

FIG. 13 shows the changes in light transmission vs. the thickness of the protective film when an $Al_2O_3$ was applied as a light transmitting window coating, as compared with the initial state where no coating was present. As shown in FIG. 13, the degree to which the transmission rate of the optical system was decreased over that of its initial state is a function of the thickness of the protective film. It is best to use the thinnest film possible to hold down this initial degradation. On the other hand, in order for the protective film to be effective, it has to cover all of the surfaces of the optical system. In general, the thin film is not of uniform film structure at the initial stage of its application, it forms island-like structures on the optical surfaces to leave part of the optical surfaces exposed, and an effective protective film has yet to be achieved.

Observations of the surface with an AFM (atomic force microscope) after protective film formation revealed that it was necessary to cover the substrate to a film thickness of 2 nm or greater in order to form a flat, smooth thin film.

Further, regarding abundantly thick film thickness of 20 nm or more, created with the objective of effectively protecting the surface of the optical systems, it was found that with protective films of $SiO_2$ or $Al_2O_3$, MgO, $TiO_2$, or $ZrO_2$, due to their high absorption of vacuum ultraviolet light, the characteristics of the optical systems upon which they were used were substantially degraded, and that the degradation and heat caused by the absorption by the protective film itself could cause it to peel off or otherwise cause a problem with the surface of the optical system. Because this absorption of vacuum ultraviolet results in the inability of optical systems to function as anticipated, the upper limit for film thickness is set at 20 nm or greater, preferably 12 nm or greater, or even more preferably 10 nm or greater.

In the present examples, a protective film thickness of 6 nm was employed. At this thickness for the protective film the transmission rate for 122 nm wavelength light was 50% of the 100% transmission rate assigned to the initial state where no protective film was used.

Further, photodiode 12 was positioned to receive the lamp light emissions 9 as a means of monitoring the light output of said lamp.

Next, photodiode 12 was used to measure any changes in the amount of light output for the microwave-excited hydrogen ultraviolet lamp with the above-described structure.

First, the hydrogen atoms were excited by plasma 7 and light was generated in the vacuum ultraviolet light wavelength range for 90 hours (about 4 days). Next, as a control, light transmitting window 8 was replaced with one having no protective film, and the test was repeated and results compared.

The following evaluation method was employed. The initial transmission rate of the light transmitting window was $T_1$ (in the case of the control experiment, $T_0=T_1$), and then after use, to wit, 90 hours later, the reduced transmission rate was $T_2$, and then the change in transmission rate $\Delta T[\%]$ was computed as:

$$\Delta T=(T_1 \cdot T_2)/90 \qquad \text{Equation (1)}$$

Also, the ratio of change was expressed as the degradation rate K [%/hr.] as defined in the following equation.

$$K=100 \cdot \Delta T/T_0 \qquad \text{Equation (2)}$$

It was possible to quickly quantify and evaluate the degradation of light transmitting window 8 by comparing the magnitude of the degradation rate K. Naturally, the lower the value of K, the milder the degradation of the light transmitting window, the longer its longevity and the less frequently it required replacement.

Results indicated that when a protective film ($Al_2O_3$) was used on light transmitting window 8, the degradation rate K was 0.04%/Hr. On the other hand, the degradation rate K for the control was 0.46%/Hr., about 11-times that of the coated window. Based upon this evaluation, we found that protective film 10A on light transmitting window 8 delivered an approximate factor of 10 improvement in longevity compared with no coating being used.

To clarify the effects of protective film 10A, the results of XPS surface analysis will be explained for light transmitting window 8 coated with $Al_2O_3$ as protective film 10A, both before and after its use in a lamp, and as a control, for the surface of a light transmitting window not having a protective film, both before and after its use in a lamp.

Figure 9:
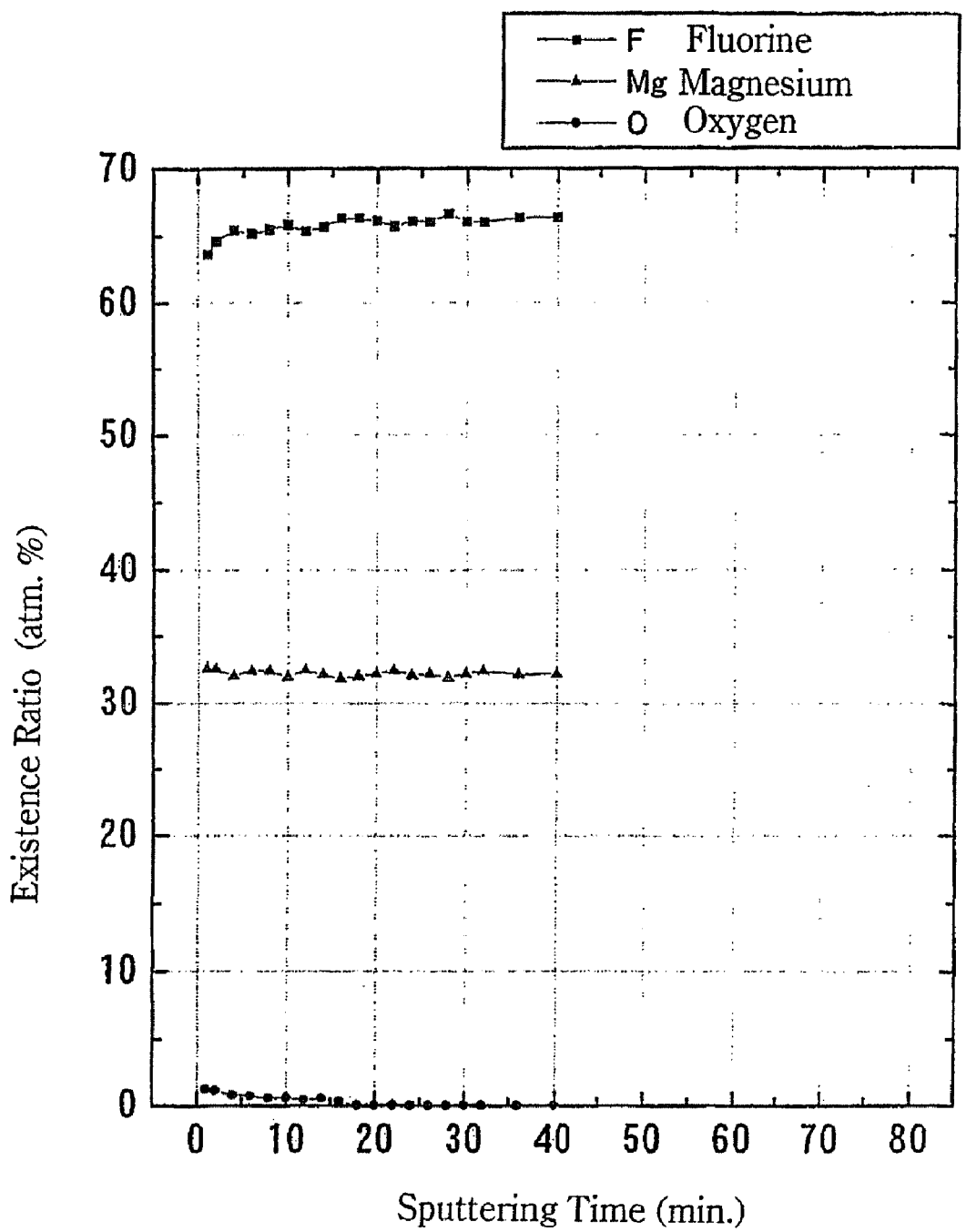
FIG. 9 is a graph showing the XPS depth distribution measurements for a light transmitting window before its being used that does not have a protective film coating.

FIG. 9 shows the analytical results for the control before use. The horizontal axis is the argon time, the amount being proportional to the sputtering depth. Sputtering time zero min. indicates the initial state prior to sputtering, and it corresponds to the analysis of the crystal surface. In general with XPS analysis, the information obtained for the initial state reflects the substance's natural contamination, detected as the adsorption component for carbon, oxygen or the like. However, since there was virtually none, it was omitted from the analytical data. The vertical axis expresses the ratio at which the various elements were found by XPS.

FIG. 9 shows that prior to use, there was no fluorine loss for the control window. Although trace amounts of oxygen were found on the surface, none was found to exist internally within the crystal. The oxygen in the contamination material naturally adsorbed onto the surface, was due to the argon sputtering which drove it into the crystal. Accordingly, with regard to the presence or absence of oxygen within the crystal, the amount of oxygen shown in FIG. 9 should be interpreted as the slight amount that should be used as the basis for the calibration of other analytical results.

Figure 10:
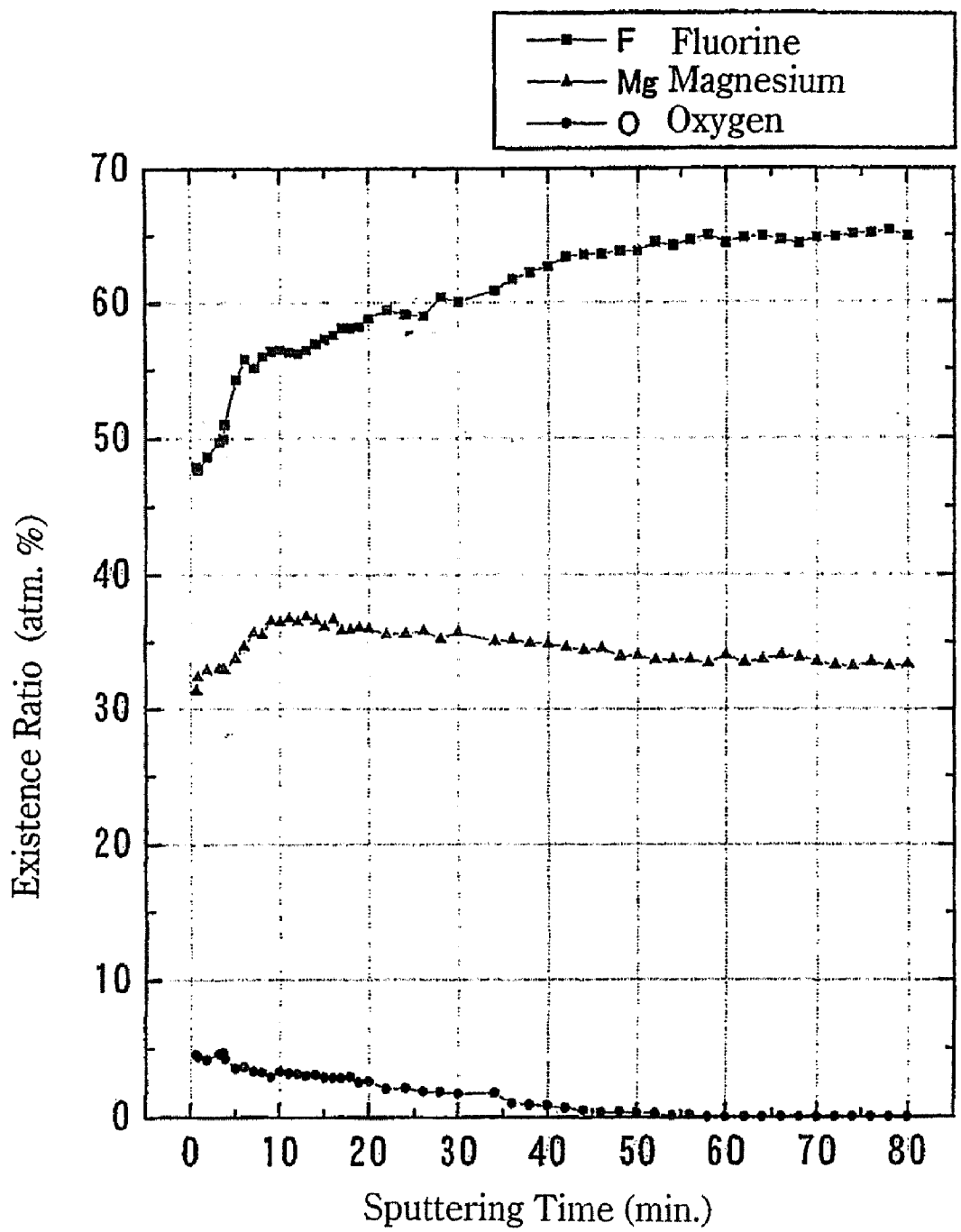
FIG. 10 is a graph showing the XPS depth distribution measurements for a light transmitting window after being used that does not have protective film coating.

FIG. 10 shows the analytical results for the control after it had been used. FIG. 10 clearly indicates a fluorine loss from the surface of the control sample. A significant presence of oxygen was also found at the same depth in the crystal as the fluorine-deficient layer. Thus, in the control sample after use, the surface layer showed both an F deficiency and oxidation. This surface state was the primary cause in the reduction in the transmission rate for the 122 nm wavelength vacuum ultraviolet light.

Figure 11:
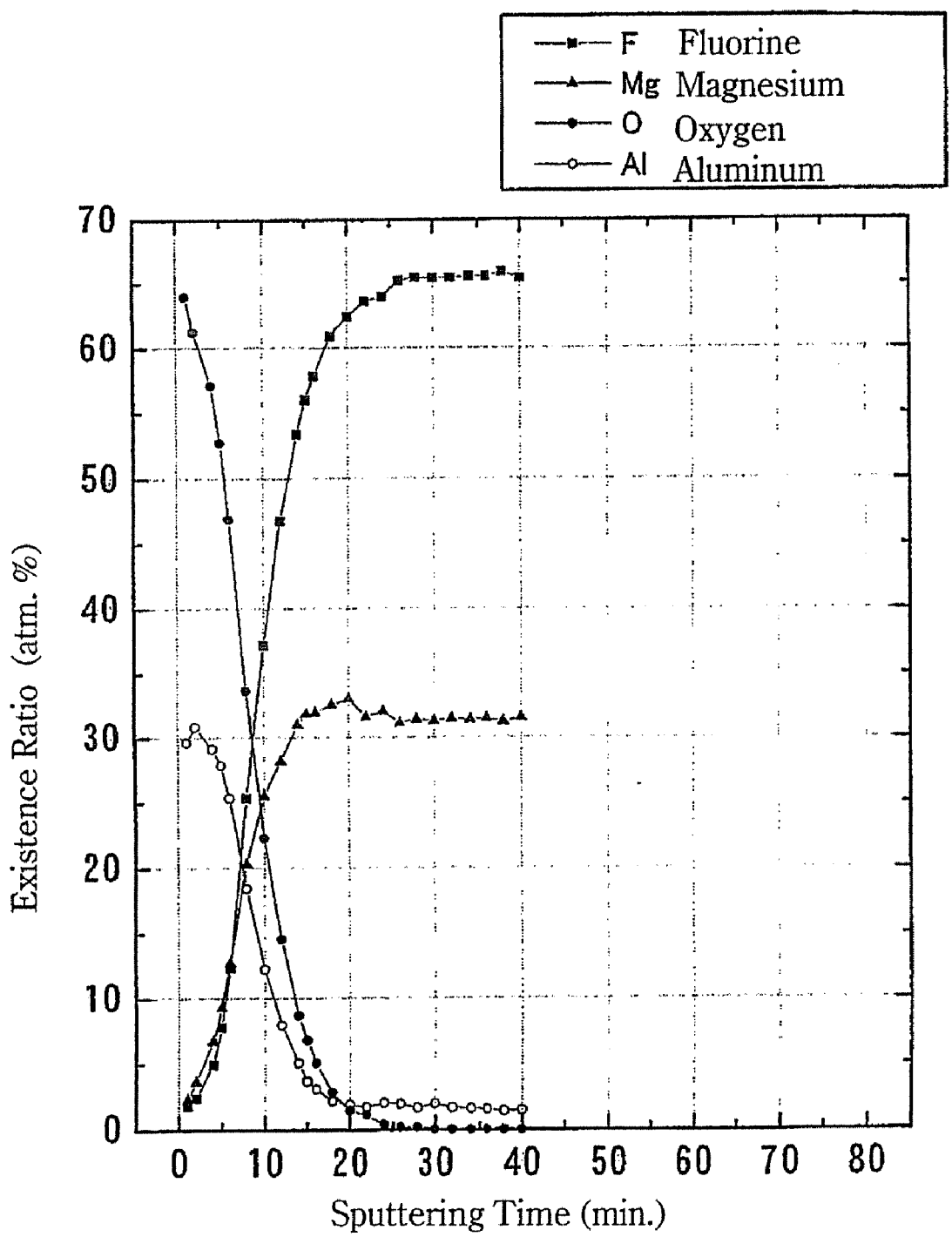
FIG. 11 is a graph showing the XPS depth distribution measurements for a light transmitting window before its being used that has a protective film coating.

Next, protective film 10A of $Al_2O_3$ was applied to an approximate 5 nm thickness on light transmitting window 8, and FIG. 11 shows the analytical results prior to its being used. The explanation of the graph axes and interpretations are the same as for FIG. 9 and further elaboration will be omitted. Al (aluminum), one of the protective film components, has been newly added to the plot. FIG. 11 shows that the fluorine and magnesium synchronous profiles extend from the surface to the inside, and that the synchronous profiles of oxygen and aluminum extend from the surface layer to the inside. Thus, the reason why the XPS analysis detected signals from fluorine and magnesium from the surface layer, despite the protective film coating, is that the resolution of the XPS analysis in the depth direction is several nm. Thus, even if the ideal boundary distribution is attempted to be measured, it will not show up in the profile as a step because the width of the resolution is unavoidably broad in shape. Further, with respect to the protective film thickness of 5 nm, if sputtering is not performed for about 20 minutes, the $MgF_2$ crystals of the substrate will remain exposed. This is due to the differences in sputtering efficiency between $Al_2O$ and $MgF_2$. Focusing on this point, it was possible to understand the areas where the F and Mg, and the O and Al profiles were synchronous.

Figure 12:
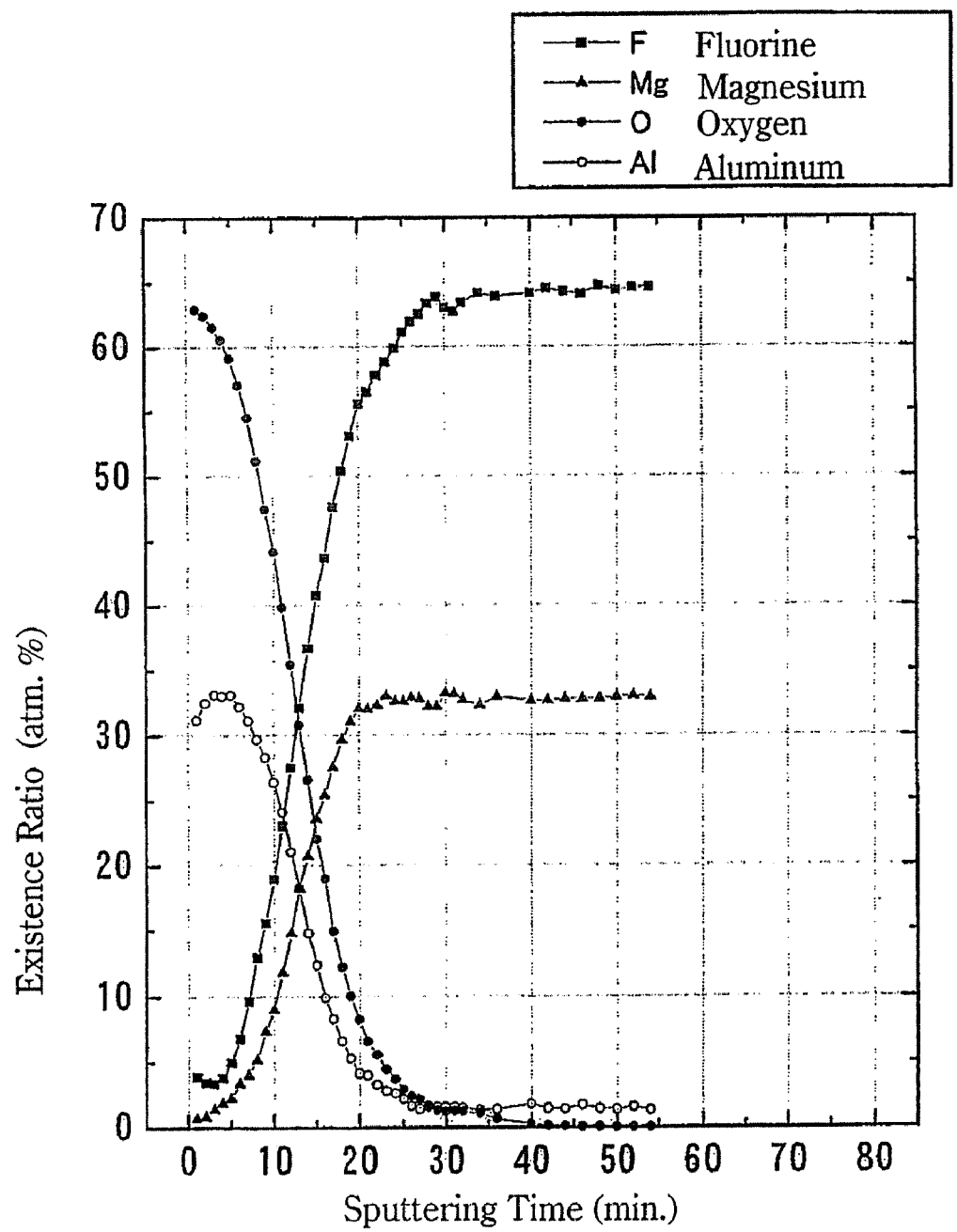
FIG. 12 is a graph showing the XPS depth distribution measurements for a light transmitting window after being used that has a protective film coating.

Finally, FIG. 12 shows the analytical results after use of light transmitting window 8 that had been coated with about a 6 nm thickness of $Al_2O_3$ as the protective film. The explanation of the graph axes and interpretations are the same as for FIG. 9, and further elaboration will be omitted. FIG. 12 shows that the profiles of the oxygen and aluminum from the surface toward the inside were synchronous. Further, the existence of oxygen inside of the crystal was not confirmed. This makes it clear that the invasion of oxygen into the interior of the crystal was prevented by the protective film.

On the other hand, the profiles of the fluorine and magnesium from the surface and into the center were not synchronous. It was clear that fluorine had penetrated into the Al2O3 of protective film 10A. However, due to the presence of protective film 10A, although the fluorine was present inside of the protective film, the fluorine had not been expelled altogether to cause a fluorine deficiency, as was the case in the control, which makes it easy to imagine the mechanism by which oxygen invades as a replacement. In fact, the formation of a fluorine deficiency layer and an oxide layer as describe using FIG. 10 is easily explained if the case for no protective film in FIG. 12 is considered.

As has been explained above, by using protective film 10A as a coating on light transmitting window 8, it is possible to suppress the generation of a fluorine deficient layer, and prevent or suppress the presence of oxygen (an oxide layer) inside the crystal, and further, when compared to the control, the light transmitting window having the protective film coating delivered a degradation rate K that was lower by about a factor of 10.

Also, when using a $SiO_2$ coating (film thickness 6 nm) as the protective film for light transmitting window 8, the degradation rate K is 0.06%/Hr. On the other hand, the degradation rate K of the control was 0.46%/Hr. This confirms that a similar level of protection was achieved even when using $SiO_2$ in the protective film, about an 8-fold improvement in the degradation rate K.

Further, just as with $Al_2O_3$, metal oxides such as MgO, $TiO_2$, $ZrO_2$, which exhibit less discoloration under ultraviolet light irradiation than fluorine compounds, may also be used as materials for the protective films.

As has been described above, optical systems according to the present invention having protective films formed upon them, have optical properties themselves (e.g. if it is a light transmitting window, it would be the light transmission rate) that are inferior to those provided in the pre-coated state, without the protective film. However, it is not appropriate to evaluate those optical systems alone, it is important to evaluate them as parts incorporated into a light output device overall as a part of a system employing a light output device. To wit, it is possible to compensate for the aforementioned initial inferiority of the optic systems in the optical output device, and match the light output to the specifications required for the system, which makes it possible to sustain the output of the light output device and increase its longevity to thereby achieve the objective of providing light output devices in which the frequency of maintenance and the cost maintenance for their light transmitting windows, etc. are substantially reduced.

Also, the use of this invention for light sources used in measurement applications is especially beneficial. An example is performing long term monitoring or the like of the generation of environmental pollutants. Generally, when making this sort of measurement, the level of the signal and sensitivity in measurement is proportional to the square of the light output. As described above, in the prior art, the measurement sensitivity of the light source was improved by improving the output of the light source, but the resulting degradation of the optical systems made it necessary to suppress the degradation of the optical system that reduced the light output, and diminished the sensitivity of the measurement. The optical system used in the present invention lengthens the longevity of the light output device, and maintains output properties that are more stable over the long term to resolve the foregoing problem and provide a light output device that is appropriate for use in long term environmental monitoring.

The implementation examples above used the example of the light transmitting window, but it may as well be applied to devices using light reflecting mirrors (windows). Examples of such light reflecting mirrors are the reflecting mirrors used in laser oscillators and focusing mirrors used in lamps. Thus, the light reflecting mirrors could be used in similar implementation examples.

EFFECTS OF THE INVENTION

As specified above, the present invention makes possible the prevention or suppression of the degradation of optical systems specifically due to carbon buildup that reduces the transmission rate and determines the longevity of the foregoing systems and optical elements to thereby reduce the frequency of maintenance operations to replace optical systems and reduce operational costs in a variety of optical apparatus employing high photon energy light such as conventional ultraviolet light or vacuum ultraviolet light when used in systems using optical elements one or a combination of optical effects such as transmission, refraction, reflection, spectrum generation, interference, for example when said transmitting or reflecting optical elements are positioned within the boundaries of a near vacuum zone where decomposable organic components can cause degradation of optical elements along the light path in the vacuum zone for diffraction, refraction, spectrum generation, transmission, or analytical position adjusting optical elements or other surfaces subjected to irradiation, including containers, seal materials and position adjusting equipment for optical elements are present, such as exposure apparatus (steppers) and color plates that are used in the semiconductor industry with vacuum ultraviolet light.

Specifically, by preventing or suppressing the decline in the light transmission rate in optical systems caused by the buildup of carbon on their surfaces, it is possible to prevent or suppress the degradation of said optical systems and thereby reduce the frequency of maintenance operations to replace, etc., optical systems and lower operating costs.

Further, by preventing or suppressing the buildup of carbon on irradiated surfaces and emission surfaces in optical systems along the light path in a vacuum zone, it is possible to extend the longevity of downstream equipment and improve the reliability of the equipment.

In particular, since the present invention makes possible the prevention or suppression of the diminishment of the optical transmission rate due to carbon buildup on the light transmitting window and other optical elements, the required maintenance interval for the cleaning or replacement of the light transmitting window, etc., may be extended to thereby contribute to improving the operational rate of the equipment and reducing maintenance costs.

Also, by preventing or suppressing the buildup of carbon on irradiated surfaces and emission surfaces of optical elements and optical systems used in vacuum zones in which light output apparatus irradiate light, it is possible to extend the longevity of downstream apparatus and improve the reliability of the equipment. Further, the method of the present invention can be employed to irradiate optical elements that have been previously degraded by carbon buildup to irradiate these degraded optical elements and restore them to their original condition.

Thus, through the use of this invention, the maintenance cycle for the cleaning or replacement of optical elements used with inside the aforementioned vacuum zones can be lengthened, to thereby contribute to the improvement in the operational rate of the equipment and the reduction of maintenance costs.

Since the present invention, as described above, makes it possible to prevent or suppress the deterioration of optical systems and extend the maintenance cycle at which they must be replaced, it contributes to the improvement of the operational rate of the equipment and to the reduction of maintenance costs.

Furthermore, by incorporating optical systems according to the present invention into equipment that utilizes light, it is possible to extend the longevity of such equipment and secure stable output characteristics from that equipment over the long term.

What is claimed is:

1. An optical system comprising fluoride compounds provided in an environment being exposed by vacuum ultraviolet light or plasma light, which has higher photon energy than an absorption wavelength of a base stock of said optical system, wherein
   a protective film having a film thickness of 2-20 nm is formed in contact with a surface of the optical system at least on the light irradiation side (inner side) of said optical system to prevent the stripping of the fluorine atoms from the surface of said optical system,
   said protective film consists of 1-layer selected from the group consisting of $SiO_2$, MgO, $TiO_2$, or $ZrO_2$, and
   said optical system comprises a mono-crystal fluoride material having a crystal axis (c axis) along a direction of the light irradiation.

2. The optical system according claim 1, wherein said protective film is formed by an ion beam sputtering method or plasma CVD.

3. An optical system comprising fluoride compounds provided in an environment being exposed by vacuum ultraviolet light or plasma light, which has higher photon energy than an absorption wavelength of a base stock of said optical system, wherein
   a protective film having a film thickness of 2-20 nm is formed in contact with a surface of the optical system at least on the light irradiation side (inner side) of said optical system to prevent an oxide from forming on the surface of said optical system,
   said protective film consists of 1-layer selected from the group consisting of $SiO_2$ MgO, $TiO_2$, or $ZrO_2$, and
   said optical system comprises a mono-crystal fluoride material having a crystal axis (c axis) along a direction of the light irradiation.

* * * * *